US010875658B2

(12) United States Patent
Evulet

(10) Patent No.: US 10,875,658 B2
(45) Date of Patent: Dec. 29, 2020

(54) EJECTOR AND AIRFOIL CONFIGURATIONS

(71) Applicant: JETOPTERA, INC., Edmonds, WA (US)

(72) Inventor: Andrei Evulet, Edmonds, WA (US)

(73) Assignee: JETOPTERA, INC., Edmonds, WA (US)

(*) Notice: Subject to any disclaimer, the term of this patent is extended or adjusted under 35 U.S.C. 154(b) by 345 days.

(21) Appl. No.: 16/031,586

(22) Filed: Jul. 10, 2018

(65) Prior Publication Data
US 2019/0047712 A1 Feb. 14, 2019

Related U.S. Application Data

(62) Division of application No. 15/221,439, filed on Jul. 27, 2016.
(Continued)

(51) Int. Cl.
*B64C 23/00* (2006.01)
*B64D 33/04* (2006.01)
(Continued)

(52) U.S. Cl.
CPC ............... *B64D 33/04* (2013.01); *B64C 9/38* (2013.01); *B64C 15/00* (2013.01); *B64C 15/14* (2013.01); *B64C 21/00* (2013.01); *B64C 21/04* (2013.01); *B64C 23/005* (2013.01); *B64C 39/024* (2013.01); *B64D 27/10* (2013.01); *B64D 27/18* (2013.01); *B64D 29/02* (2013.01); *B64D 33/02* (2013.01); *F02C 3/04* (2013.01);
(Continued)

(58) Field of Classification Search
CPC ..... B64C 9/38; B64C 21/025; B64C 21/0408; B64C 2230/04; B64C 2230/06; B64C 23/00; B64D 27/18; B64D 33/04
See application file for complete search history.

(56) References Cited

U.S. PATENT DOCUMENTS 3,051,413 A * 8/1962 Pouit .................. B64C 23/005
244/12.5
4,285,482 A * 8/1981 Lewis .................... B64C 9/22
244/207
(Continued)

FOREIGN PATENT DOCUMENTS

AU 2009100459 A4 7/2009
AU 2011356667 A1 8/2013
(Continued)

OTHER PUBLICATIONS

Larry D Birckelbaw, "High Speed Aerodynamics of Upper Surface Blowing Aircraft Configurations", 10th Applied Aerodynamics Conference, 1992, pp. 100-116, California, USA.
(Continued)

*Primary Examiner* — Philip J Bonzell
*Assistant Examiner* — Tye William Abell
(74) *Attorney, Agent, or Firm* — Foster Garvey PC

(57) ABSTRACT

A propulsion system coupled to a vehicle. The system includes an ejector having an outlet structure out of which propulsive fluid flows at a predetermined adjustable velocity. A control surface having a leading edge is located directly downstream of the outlet structure such that propulsive fluid from the ejector flows over the control surface.

5 Claims, 10 Drawing Sheets

Related U.S. Application Data

(60) Provisional application No. 62/213,465, filed on Sep. 2, 2015.

(51) Int. Cl.

| | | |
|---|---|---|
| *B64C 39/02* | (2006.01) | |
| *B64C 15/14* | (2006.01) | |
| *B64C 9/38* | (2006.01) | |
| *B64C 15/00* | (2006.01) | |
| *B64C 21/00* | (2006.01) | |
| *B64D 27/10* | (2006.01) | |
| *B64C 21/04* | (2006.01) | |
| *F02K 1/36* | (2006.01) | |
| *F02K 1/00* | (2006.01) | |
| *F02C 3/04* | (2006.01) | |
| *F02C 6/04* | (2006.01) | |
| *B64D 27/18* | (2006.01) | |
| *B64D 29/02* | (2006.01) | |
| *B64D 33/02* | (2006.01) | |

(52) U.S. Cl.
CPC .............. *F02C 6/04* (2013.01); *F02K 1/002* (2013.01); *F02K 1/36* (2013.01); *B64C 2201/10* (2013.01); *B64C 2201/104* (2013.01); *B64C 2230/04* (2013.01); *B64C 2230/16* (2013.01); *B64D 2033/0273* (2013.01); *F05D 2220/90* (2013.01); *Y02T 50/10* (2013.01); *Y02T 50/30* (2013.01); *Y02T 50/40* (2013.01)

(56) References Cited

U.S. PATENT DOCUMENTS

| | | | |
|---|---|---|---|
| 4,442,986 A * | 4/1984 | Rousseau | B64C 21/02 180/116 |
| 4,796,836 A | 1/1989 | Buchelt | |
| 4,898,343 A | 2/1990 | Kamo | |
| 5,035,377 A | 7/1991 | Buchelt | |
| 5,096,012 A | 3/1992 | Chia et al. | |
| 5,098,034 A | 3/1992 | Lendriet | |
| 5,102,067 A | 4/1992 | Weiner et al. | |
| 5,115,996 A | 5/1992 | Moller | |
| 5,123,613 A | 6/1992 | Piasecki | |
| 5,129,602 A | 7/1992 | Leonard | |
| 5,145,129 A | 9/1992 | Gebhard | |
| 5,149,012 A | 9/1992 | Valverde | |
| 5,152,478 A | 10/1992 | Cycon et al. | |
| 5,154,052 A | 10/1992 | Giffin et al. | |
| 5,158,251 A | 10/1992 | Taylor | |
| 5,161,953 A | 11/1992 | Burtis | |
| 5,170,963 A | 12/1992 | Beck | |
| 5,170,964 A | 12/1992 | Enderle et al. | |
| 5,174,523 A | 12/1992 | Balmford | |
| 5,178,344 A | 1/1993 | Dlouhy | |
| 5,201,478 A | 4/1993 | Wooley | |
| 5,209,428 A | 5/1993 | Bevilaqua et al. | |
| 5,240,206 A | 8/1993 | Omiya | |
| 5,242,132 A | 9/1993 | Wukowitz | |
| 5,244,167 A | 9/1993 | Turk et al. | |
| 5,246,188 A | 9/1993 | Koutsoupidis | |
| 5,251,846 A | 10/1993 | Rethorst | |
| 5,253,828 A | 10/1993 | Cox | |
| 5,267,626 A | 12/1993 | Tanfield | |
| 5,277,381 A | 1/1994 | Piasecki | |
| 5,280,863 A | 1/1994 | Schmittle | |
| 5,282,357 A | 2/1994 | Sackheim | |
| 5,295,643 A | 3/1994 | Ebbert et al. | |
| 5,312,069 A | 5/1994 | Bollinger et al. | |
| 5,320,306 A | 6/1994 | Gennaro | |
| 5,340,057 A | 8/1994 | Schmittle | |
| 5,351,911 A | 10/1994 | Neumayr | |
| 5,358,156 A | 10/1994 | Rethorst | |
| 5,390,877 A | 2/1995 | Nightingale | |
| 5,395,073 A | 3/1995 | Rutan et al. | |
| 5,407,150 A | 4/1995 | Sadleir | |
| 5,435,489 A | 7/1995 | Jenkins et al. | |
| 5,454,530 A | 10/1995 | Rutherford et al. | |
| 5,454,531 A | 10/1995 | Melkuti | |
| 5,503,351 A | 4/1996 | Vass | |
| 5,531,400 A | 7/1996 | Demidov et al. | |
| 5,560,568 A | 10/1996 | Schmittle | |
| RE35,387 E | 12/1996 | Strom | |
| 5,676,333 A | 10/1997 | Rethorst | |
| 5,687,934 A | 11/1997 | Owens | |
| 5,713,537 A | 2/1998 | Tindell | |
| 5,727,754 A | 3/1998 | Carter | |
| 5,758,844 A | 6/1998 | Cummings | |
| 5,765,776 A | 6/1998 | Rogers et al. | |
| 5,765,777 A | 6/1998 | Schmittle | |
| 5,769,317 A | 6/1998 | Sokhey et al. | |
| 5,769,359 A | 6/1998 | Rutan et al. | |
| 5,779,188 A | 7/1998 | Frick | |
| 5,791,601 A | 8/1998 | Dancila et al. | |
| 5,791,875 A | 8/1998 | Ngo | |
| 5,803,199 A | 9/1998 | Walter | |
| 5,810,284 A | 9/1998 | Hibbs et al. | |
| 5,823,468 A | 10/1998 | Bothe | |
| 5,829,714 A | 11/1998 | Lechtenberg | |
| 5,836,542 A | 11/1998 | Burns | |
| 5,863,013 A | 1/1999 | Schmittle | |
| 5,881,970 A | 3/1999 | Whitesides | |
| 5,897,078 A | 4/1999 | Burnham et al. | |
| 5,904,320 A | 5/1999 | Tindell | |
| 5,934,873 A | 8/1999 | Greene | |
| 5,951,608 A | 9/1999 | Osder | |
| 5,971,320 A | 10/1999 | Jermyn et al. | |
| 5,975,462 A | 11/1999 | Platzer | |
| 5,984,229 A | 11/1999 | Hollowell et al. | |
| 5,992,792 A | 11/1999 | Arnason | |
| 5,996,933 A | 12/1999 | Schier | |
| 6,000,635 A | 12/1999 | Justice | |
| 6,015,115 A | 1/2000 | Dorsett et al. | |
| 6,016,996 A | 1/2000 | Angel | |
| 6,036,142 A | 3/2000 | Yates | |
| 6,073,881 A | 6/2000 | Chen | |
| 6,082,478 A | 7/2000 | Walter et al. | |
| 6,086,015 A | 7/2000 | Maccready | |
| 6,086,016 A | 7/2000 | Meek | |
| 6,105,901 A | 8/2000 | Ulanoski et al. | |
| 6,113,028 A | 9/2000 | Lohse et al. | |
| 6,113,029 A | 9/2000 | Salinas | |
| 6,135,393 A | 10/2000 | Sackheim et al. | |
| 6,142,425 A | 11/2000 | Armanios et al. | |
| 6,171,055 B1 | 1/2001 | Vos et al. | |
| 6,193,187 B1 | 2/2001 | Scott et al. | |
| 6,259,976 B1 | 7/2001 | Lemelson et al. | |
| 6,270,036 B1 | 8/2001 | Lowe | |
| 6,318,668 B1 | 11/2001 | Ulanoski et al. | |
| 6,336,319 B1 | 1/2002 | Koshoffer | |
| 6,340,289 B1 | 1/2002 | Vos et al. | |
| 6,352,219 B1 | 3/2002 | Zelic | |
| 6,367,243 B1 | 4/2002 | Schmidt | |
| 6,367,737 B1 | 4/2002 | Lohse et al. | |
| 6,382,559 B1 | 5/2002 | Sutterfield et al. | |
| 6,382,560 B1 | 5/2002 | Ow | |
| 6,398,157 B1 | 6/2002 | Ingram | |
| 6,415,597 B1 | 7/2002 | Futamura et al. | |
| 6,464,166 B1 | 10/2002 | Yoeli | |
| 6,471,158 B1 | 10/2002 | Davis | |
| 6,474,603 B1 | 11/2002 | Kinkead et al. | |
| 6,513,752 B2 | 2/2003 | Carter | |
| 6,561,456 B1 | 5/2003 | Devine | |
| 6,568,171 B2 | 5/2003 | Bulman | |
| 6,568,630 B2 | 5/2003 | Yoeli | |
| 6,575,406 B2 | 6/2003 | Nelson | |
| 6,592,071 B2 | 7/2003 | Kinkead et al. | |
| 6,607,162 B2 | 8/2003 | Warsop et al. | |
| 6,616,094 B2 | 9/2003 | Illingworth | |
| 6,622,472 B2 | 9/2003 | Plumpe | |
| 6,622,962 B1 | 9/2003 | White | |
| 6,655,631 B2 | 12/2003 | Austen-Brown | |
| 6,662,086 B2 | 12/2003 | Lemelson et al. | |

(56) References Cited

U.S. PATENT DOCUMENTS

| | | |
|---|---|---|
| 6,691,949 B2 | 2/2004 | Plump et al. |
| 6,695,251 B2 | 2/2004 | Rodden et al. |
| 6,751,530 B2 | 6/2004 | Seifert et al. |
| 6,786,040 B2 | 9/2004 | Boehnlein et al. |
| 6,786,450 B1 | 9/2004 | Einstein |
| 6,793,172 B2 | 9/2004 | Liotta |
| 6,793,174 B2 | 9/2004 | Ouellette et al. |
| 6,808,140 B2 | 10/2004 | Moller |
| 6,817,570 B2 | 11/2004 | Yoeli |
| 6,824,095 B2 | 11/2004 | Mao |
| 6,824,097 B1 | 11/2004 | Ouellette et al. |
| 6,824,109 B2 | 11/2004 | Garver |
| 6,840,478 B2 | 1/2005 | Carr |
| 6,843,447 B2 | 1/2005 | Morgan |
| 6,848,647 B2 | 2/2005 | Albrecht |
| 6,848,649 B2 | 2/2005 | Churchman |
| 6,851,650 B2 | 2/2005 | Sankrithi |
| 6,854,686 B2 | 2/2005 | Perlo et al. |
| 6,860,449 B1 | 3/2005 | Chen |
| 6,863,241 B2 | 3/2005 | Sash |
| 6,880,784 B1 | 4/2005 | Wilkinson et al. |
| 6,883,748 B2 | 4/2005 | Yoeli |
| 6,885,917 B2 | 4/2005 | Osder et al. |
| 6,886,776 B2 | 5/2005 | Wagner et al. |
| 6,892,979 B2 | 5/2005 | Milde |
| 6,892,980 B2 | 5/2005 | Kawai |
| 6,918,244 B2 | 7/2005 | Dickau |
| 6,926,229 B2 | 8/2005 | Cummings et al. |
| 6,926,231 B2 | 8/2005 | Ouellette et al. |
| 6,938,854 B2 | 9/2005 | Nelson |
| 6,948,682 B1 | 9/2005 | Stephenson et al. |
| 6,974,106 B2 | 12/2005 | Churchman |
| 6,976,653 B2 | 12/2005 | Perlo et al. |
| 6,976,654 B2 | 12/2005 | Ouellette et al. |
| 6,983,587 B2 | 1/2006 | Shumate |
| 7,032,698 B2 | 4/2006 | Lee et al. |
| 7,032,861 B2 | 4/2006 | Sanders et al. |
| 7,040,574 B2 | 5/2006 | Richards |
| 7,104,498 B2 | 9/2006 | Englar et al. |
| 7,118,066 B2 | 10/2006 | Allen |
| 7,121,503 B2 | 10/2006 | Cordy |
| 7,137,592 B2 | 11/2006 | Barocela et al. |
| 7,143,973 B2 | 12/2006 | Ballew |
| 7,147,182 B1 | 12/2006 | Flanigan |
| 7,147,183 B1 | 12/2006 | Carr et al. |
| 7,150,432 B2 | 12/2006 | Ouellette et al. |
| 7,159,817 B2 | 1/2007 | Vandermey et al. |
| 7,188,802 B2 | 3/2007 | Magre |
| 7,201,346 B2 | 4/2007 | Hansen |
| 7,219,854 B2 | 5/2007 | Boschma et al. |
| 7,231,997 B2 | 6/2007 | De roche |
| 7,246,769 B2 | 7/2007 | Yoeli |
| 7,249,732 B2 | 7/2007 | Sanders et al. |
| 7,258,302 B2 | 8/2007 | Carr et al. |
| 7,275,711 B1 | 10/2007 | Flanigan |
| 7,275,712 B2 | 10/2007 | Yoeli |
| 7,281,683 B2 | 10/2007 | Delaplace et al. |
| 7,290,738 B1 | 11/2007 | Rogers et al. |
| 7,305,285 B2 | 12/2007 | Villaume et al. |
| 7,316,371 B2 | 1/2008 | Wyrembek et al. |
| 7,322,546 B2 | 1/2008 | Snow et al. |
| 7,410,122 B2 | 8/2008 | Robbins et al. |
| 7,427,048 B2 | 9/2008 | Ouellette |
| 7,438,259 B1 | 10/2008 | Piasecki et al. |
| 7,461,811 B2 | 12/2008 | Milde |
| 7,472,863 B2 | 1/2009 | Pak |
| 7,506,837 B2 | 3/2009 | Parks |
| 7,520,466 B2 | 4/2009 | Bostan |
| 7,555,893 B2 | 7/2009 | Okai et al. |
| 7,556,218 B2 | 7/2009 | Schlunke |
| 7,568,657 B2 | 8/2009 | Milde |
| 7,581,381 B2 | 9/2009 | Bryant |
| 7,581,383 B2 | 9/2009 | Ouellette |
| 7,581,696 B2 | 9/2009 | Morgan et al. |
| 7,584,923 B2 | 9/2009 | Burrage |
| 7,584,924 B2 | 9/2009 | Ow |
| 7,604,201 B2 | 10/2009 | Alecu |
| 7,607,606 B2 | 10/2009 | Milde |
| 7,654,486 B2 | 2/2010 | Milde |
| 7,654,489 B2 | 2/2010 | Stephenson |
| 7,665,689 B2 | 2/2010 | Mccomb |
| 7,677,502 B2 | 3/2010 | Lawson et al. |
| 7,717,368 B2 | 5/2010 | Yoeli |
| 7,753,309 B2 | 7/2010 | Garreau |
| 7,766,274 B1 | 8/2010 | Jameson et al. |
| 7,789,342 B2 | 9/2010 | Yoeli |
| 7,806,362 B2 | 10/2010 | Yoeli |
| 7,823,838 B1 | 11/2010 | Dedning et al. |
| 7,823,840 B2 | 11/2010 | Shmilovich et al. |
| 7,841,563 B2 | 11/2010 | Goossen et al. |
| 7,857,252 B2 | 12/2010 | Walliser et al. |
| 7,857,253 B2 | 12/2010 | Yoeli |
| 7,857,256 B2 | 12/2010 | Hatton |
| 7,866,601 B2 | 1/2011 | Balaskovic |
| 7,878,458 B2 | 2/2011 | Shmilovich et al. |
| 7,883,051 B2 | 2/2011 | Sammy |
| 7,891,603 B2 | 2/2011 | Voorhees |
| 7,908,044 B2 | 3/2011 | Piasecki et al. |
| 7,918,416 B2 | 4/2011 | Yoeli |
| 7,937,945 B2 | 5/2011 | Kinde |
| 7,946,528 B2 | 5/2011 | Yoeli |
| 7,988,101 B2 | 8/2011 | Osborne et al. |
| 8,014,910 B2 | 9/2011 | Mathieu et al. |
| 8,020,804 B2 | 9/2011 | Yoeli |
| 8,061,119 B2 | 11/2011 | Agrawal et al. |
| 8,074,925 B2 | 12/2011 | Morgan et al. |
| 8,087,618 B1 | 1/2012 | Shmilovich et al. |
| 8,109,462 B2 | 2/2012 | Balaskovic |
| 8,128,033 B2 | 3/2012 | Raposo |
| 8,157,520 B2 | 4/2012 | Kolacny et al. |
| 8,162,253 B2 | 4/2012 | Seiford |
| 8,167,233 B2 | 5/2012 | Brody et al. |
| 8,167,249 B1 | 5/2012 | Harrison et al. |
| 8,181,901 B2 | 5/2012 | Roesch |
| 8,181,902 B2 | 5/2012 | Schlunke |
| 8,181,903 B2 | 5/2012 | Posva |
| 8,186,617 B2 | 5/2012 | Llamas sandin |
| 8,191,820 B1 | 6/2012 | Westra et al. |
| 8,205,822 B1 | 6/2012 | Jameson et al. |
| 8,240,125 B2 | 8/2012 | Kawai |
| 8,251,306 B2 | 8/2012 | Dacre |
| 8,262,016 B2 | 9/2012 | Gosling |
| 8,262,031 B2 | 9/2012 | Zha et al. |
| 8,291,691 B2 | 10/2012 | Spear et al. |
| 8,292,220 B1 | 10/2012 | Westra et al. |
| 8,297,550 B2 | 10/2012 | Balaskovic |
| 8,302,903 B2 | 11/2012 | Morgan et al. |
| 8,317,126 B2 | 11/2012 | Harris et al. |
| 8,328,131 B2 | 12/2012 | Gosling |
| 8,336,810 B2 | 12/2012 | Brutoco |
| 8,337,156 B2 | 12/2012 | Khmel |
| 8,367,993 B2 | 2/2013 | Velez et al. |
| 8,387,360 B2 | 3/2013 | Kinsey et al. |
| 8,408,488 B2 | 4/2013 | Leaver |
| 8,408,489 B2 | 4/2013 | Gosling |
| 8,414,260 B2 | 4/2013 | Johnson |
| 8,418,952 B2 | 4/2013 | Balaskovic |
| 8,424,808 B2 | 4/2013 | Boelitz |
| 8,453,428 B1 | 6/2013 | Kinde |
| 8,464,977 B2 | 6/2013 | Suzuki |
| 8,485,476 B2 | 7/2013 | Zha et al. |
| 8,495,879 B2 | 7/2013 | Grace |
| 8,496,200 B2 | 7/2013 | Yoeli |
| 8,500,061 B2 | 8/2013 | Chen |
| 8,505,846 B1 | 8/2013 | Sanders |
| 8,544,797 B2 | 10/2013 | Kramer |
| 8,561,935 B2 | 10/2013 | Milde |
| 8,566,000 B2 | 10/2013 | Lickfold et al. |
| 8,572,947 B2 | 11/2013 | Khalid |
| 8,573,541 B2 | 11/2013 | Sullivan et al. |
| 8,579,573 B2 | 11/2013 | Kolacny |
| 8,602,348 B2 | 12/2013 | Bryant |
| 8,616,503 B2 | 12/2013 | Balaskovic |
| 8,622,335 B2 | 1/2014 | Yoeli |

(56) References Cited

U.S. PATENT DOCUMENTS

| | | |
|---|---|---|
| 8,646,251 B2 | 2/2014 | Rosenkrans et al. |
| 8,657,053 B2 | 2/2014 | Novikov-kopp |
| 8,661,983 B1 | 3/2014 | Scarr |
| 8,689,538 B2 | 4/2014 | Sankrithi et al. |
| 8,729,442 B2 | 5/2014 | Boelitz et al. |
| 8,746,613 B2 | 6/2014 | Suchezky et al. |
| 8,777,152 B2 | 7/2014 | Thomassey |
| 8,800,259 B2 | 8/2014 | Smith et al. |
| 8,807,484 B2 | 8/2014 | Raposeiro et al. |
| 8,833,692 B2 | 9/2014 | Yoeli |
| 8,844,264 B2 | 9/2014 | Khalid |
| 8,894,002 B2 | 11/2014 | Goelet |
| 8,899,513 B1 | 12/2014 | Jameson et al. |
| 8,899,514 B2 | 12/2014 | Goelet |
| 8,931,729 B2 | 1/2015 | Abde qader alzu'bi et al. |
| 8,936,212 B1 | 1/2015 | Fu et al. |
| 8,979,015 B2 | 3/2015 | Gaillard |
| 9,008,943 B2 | 4/2015 | Lickfold et al. |
| 9,016,616 B2 | 4/2015 | Kawaguchi |
| 9,033,281 B1 | 5/2015 | Adams |
| 9,079,661 B2 | 7/2015 | Prampolini et al. |
| 9,079,663 B2 | 7/2015 | Sommer et al. |
| 9,080,450 B2 | 7/2015 | Seifert |
| 9,085,355 B2 | 7/2015 | Delorean |
| 9,102,391 B2 | 8/2015 | Brutoco |
| 9,108,711 B2 | 8/2015 | Krueger |
| 9,108,725 B1 | 8/2015 | Shmilovich et al. |
| 9,120,559 B2 | 9/2015 | Danielson et al. |
| 9,132,915 B2 | 9/2015 | Zhu |
| 9,156,564 B2 | 10/2015 | Endres |
| 9,157,377 B2 | 10/2015 | Lickfold et al. |
| 9,162,764 B2 | 10/2015 | Babinsky et al. |
| 9,187,175 B1 | 11/2015 | Chen |
| 9,193,458 B2 | 11/2015 | Pongratz et al. |
| 9,212,625 B2 | 12/2015 | Shelley |
| 9,261,019 B2 | 2/2016 | Heathco |
| 9,266,609 B1 | 2/2016 | Kunz |
| 9,272,770 B2 | 3/2016 | Joalland et al. |
| 9,272,783 B2 | 3/2016 | Pearson |
| 9,315,264 B2 | 4/2016 | Zhu |
| 9,404,721 B2 | 8/2016 | Scarr |
| 9,428,257 B2 | 8/2016 | Nelson |
| 9,493,223 B2 | 11/2016 | Brutoco |
| 9,493,235 B2 | 11/2016 | Zhou et al. |
| 9,527,577 B2 | 12/2016 | Embacher |
| 9,527,596 B1 | 12/2016 | Adams |
| 9,533,768 B2 | 1/2017 | Barmichev et al. |
| 9,540,100 B2 | 1/2017 | Dekel et al. |
| 9,540,101 B2 | 1/2017 | Paduano et al. |
| 9,540,113 B2 | 1/2017 | Gukeisen |
| 9,541,924 B2 | 1/2017 | Frolov et al. |
| 9,567,062 B2 | 2/2017 | Chandler et al. |
| 9,573,680 B2 | 2/2017 | Shmilovich et al. |
| 9,580,183 B2 | 2/2017 | Agrawal et al. |
| 9,580,188 B2 | 2/2017 | Endres |
| 9,586,683 B1 | 3/2017 | Buchmueller et al. |
| 9,587,585 B1 | 3/2017 | Rolling et al. |
| 9,623,723 B2 | 4/2017 | Pomme |
| 9,637,218 B2 | 5/2017 | Suciu et al. |
| 9,656,748 B2 | 5/2017 | Jing |
| 9,663,219 B2 | 5/2017 | Carton et al. |
| 9,663,236 B1 | 5/2017 | Shiosaki et al. |
| 9,663,239 B2 | 5/2017 | Suciu et al. |
| 9,682,774 B2 | 6/2017 | Paduano et al. |
| 9,702,254 B2 | 7/2017 | Saiz |
| 9,714,082 B2 | 7/2017 | Shmilovich et al. |
| 9,714,090 B2 | 7/2017 | Frolov et al. |
| 9,731,818 B2 | 8/2017 | Dekel et al. |
| 9,751,597 B1 | 9/2017 | Low et al. |
| 9,751,614 B1 | 9/2017 | Nguyen et al. |
| 9,759,160 B2 | 9/2017 | Sankrithi et al. |
| 9,771,151 B2 | 9/2017 | White |
| 9,776,710 B2 | 10/2017 | Duke |
| 9,776,715 B2 | 10/2017 | Zhou et al. |
| 9,777,698 B2 | 10/2017 | Schlak |
| 9,789,768 B1 | 10/2017 | Meier |
| 9,815,552 B1 | 11/2017 | Welsh |
| 9,816,464 B2 | 11/2017 | Seifert |
| 9,828,082 B2 | 11/2017 | Goelet |
| 9,834,305 B2 | 12/2017 | Taylor et al. |
| 9,836,065 B2 | 12/2017 | Frolov et al. |
| 9,840,318 B2 | 12/2017 | Balaskovic |
| 9,840,324 B2 | 12/2017 | Shiosaki et al. |
| 9,840,339 B1 | 12/2017 | O'brien et al. |
| 9,845,152 B2 | 12/2017 | Stan |
| 2002/0014555 A1 | 2/2002 | Smith |
| 2002/0092948 A1 | 7/2002 | Dugan |
| 2002/0096600 A1 | 7/2002 | Richards |
| 2002/0139894 A1 | 10/2002 | Sorensen |
| 2003/0062442 A1 | 4/2003 | Milde |
| 2003/0062443 A1 | 4/2003 | Wagner et al. |
| 2003/0175120 A1 | 9/2003 | St. clair |
| 2004/0004157 A1 | 1/2004 | Liotta |
| 2004/0061025 A1 | 4/2004 | Cordy |
| 2004/0094662 A1 | 5/2004 | Sanders et al. |
| 2004/0104303 A1 | 6/2004 | Mao |
| 2004/0164203 A1 | 8/2004 | Billiu |
| 2005/0116087 A1 | 6/2005 | Page |
| 2006/0006290 A1 | 1/2006 | Loth |
| 2006/0027704 A1 | 2/2006 | Dickau |
| 2006/0186261 A1 | 8/2006 | Unzicker |
| 2007/0018034 A1 | 1/2007 | Dickau |
| 2007/0102570 A1 | 5/2007 | Luffman |
| 2007/0158503 A1 | 7/2007 | Burg |
| 2007/0187547 A1 | 8/2007 | Kelly |
| 2007/0215746 A1 | 9/2007 | Rieken et al. |
| 2007/0246601 A1 | 10/2007 | Layton |
| 2008/0054121 A1 | 3/2008 | Yoeli |
| 2008/0191101 A1 | 8/2008 | Hatton et al. |
| 2008/0273961 A1 | 11/2008 | Rosenkrans et al. |
| 2008/0315042 A1 | 12/2008 | Evulet et al. |
| 2009/0008507 A1 | 1/2009 | Pearson |
| 2009/0014596 A1 | 1/2009 | Pearson et al. |
| 2009/0065631 A1 | 3/2009 | Zha |
| 2009/0065649 A1 | 3/2009 | Babinsky et al. |
| 2009/0159757 A1 | 6/2009 | Yoeli |
| 2009/0199536 A1 | 8/2009 | Bulin et al. |
| 2009/0214338 A1 | 8/2009 | Werle et al. |
| 2010/0012790 A1 | 1/2010 | Bostan |
| 2010/0019079 A1 | 1/2010 | Evulet et al. |
| 2010/0051755 A1 | 3/2010 | Nichols et al. |
| 2010/0120321 A1 | 5/2010 | Rehkemper et al. |
| 2010/0127129 A1 | 5/2010 | Zha et al. |
| 2010/0140416 A1 | 6/2010 | Ohanian et al. |
| 2010/0140417 A1 | 6/2010 | Bose et al. |
| 2010/0162680 A1 | 7/2010 | Khalid |
| 2010/0270419 A1 | 10/2010 | Yoeli |
| 2010/0270420 A1 | 10/2010 | Hansen |
| 2010/0310357 A1 | 12/2010 | Papageorgiou |
| 2011/0001000 A1 | 1/2011 | Zhu |
| 2011/0049307 A1 | 3/2011 | Yoeli |
| 2011/0139924 A1 | 6/2011 | Nakayama |
| 2011/0174920 A1 | 7/2011 | Yoeli |
| 2011/0215204 A1 | 9/2011 | Evulet |
| 2011/0240804 A1 | 10/2011 | Kehayas |
| 2011/0262275 A1 | 10/2011 | Kovalchuk et al. |
| 2011/0309202 A1 | 12/2011 | Smith |
| 2012/0080564 A1 | 4/2012 | Yoeli |
| 2012/0091257 A1 | 4/2012 | Wolff et al. |
| 2012/0096832 A1 | 4/2012 | Rosenkrans et al. |
| 2012/0128493 A1 | 5/2012 | Shelley |
| 2012/0280091 A1 | 11/2012 | Saiz |
| 2012/0304619 A1 | 12/2012 | Beachy Head |
| 2013/0068879 A1 | 3/2013 | Colting |
| 2013/0105635 A1 | 5/2013 | Alzu'bi et al. |
| 2013/0134264 A1 | 5/2013 | Carter et al. |
| 2013/0186059 A1 | 7/2013 | Epstein et al. |
| 2013/0206921 A1 | 8/2013 | Paduano et al. |
| 2013/0298540 A1 | 11/2013 | Marcus |
| 2013/0327014 A1 | 12/2013 | Moulebhar |
| 2014/0084114 A1 | 3/2014 | Valentin |
| 2014/0103159 A1 | 4/2014 | Bert |
| 2014/0151494 A1 | 6/2014 | Cvrlje |
| 2014/0263831 A1 | 9/2014 | Mitchell |

(56) References Cited

U.S. PATENT DOCUMENTS

| | | |
|---|---|---|
| 2014/0290270 A1 | 10/2014 | Bodard et al. |
| 2014/0312177 A1 | 10/2014 | Gaonjur |
| 2015/0014475 A1 | 1/2015 | Taylor et al. |
| 2015/0021430 A1 | 1/2015 | Paduano et al. |
| 2015/0102155 A1 | 4/2015 | Krastev |
| 2015/0226086 A1 | 8/2015 | Samuelson |
| 2015/0274292 A1 | 10/2015 | Delorean |
| 2015/0314867 A1 | 11/2015 | Razroev |
| 2015/0315998 A1 | 11/2015 | Krueger |
| 2016/0001872 A1 | 1/2016 | Zhu |
| 2016/0010589 A1 | 1/2016 | Rolt |
| 2016/0061145 A1 | 3/2016 | Kumar et al. |
| 2016/0101852 A1 | 4/2016 | Jiang |
| 2016/0101853 A1 | 4/2016 | Toppenberg |
| 2016/0144966 A1 | 5/2016 | Trahmer et al. |
| 2016/0159476 A1 | 6/2016 | Shattuck et al. |
| 2016/0208742 A1 | 7/2016 | Pande |
| 2016/0221675 A1 | 8/2016 | Adam |
| 2016/0236774 A1 | 8/2016 | Niedzballa |
| 2016/0288903 A1 | 10/2016 | Rothhaar et al. |
| 2016/0332714 A1 | 11/2016 | Nelson |
| 2016/0332741 A1 | 11/2016 | Moxon |
| 2016/0342160 A1 | 11/2016 | Shepshelovich et al. |
| 2016/0347447 A1 | 12/2016 | Judas et al. |
| 2016/0376003 A1 | 12/2016 | Feldman |
| 2017/0008625 A1 | 1/2017 | Olm et al. |
| 2017/0029100 A1 | 2/2017 | Zhu |
| 2017/0057621 A1 | 3/2017 | Evulet |
| 2017/0057647 A1 | 3/2017 | Evulet |
| 2017/0057648 A1 | 3/2017 | Evulet |
| 2017/0073070 A1 | 3/2017 | Xing |
| 2017/0073078 A1 | 3/2017 | Barmichev et al. |
| 2017/0089298 A1 | 3/2017 | Joshi et al. |
| 2017/0097644 A1 | 4/2017 | Fegely et al. |
| 2017/0107000 A1 | 4/2017 | Endres |
| 2017/0113793 A1 | 4/2017 | Toulmay |
| 2017/0152014 A1 | 6/2017 | Gould et al. |
| 2017/0159565 A1 | 6/2017 | Evulet |
| 2017/0183091 A1 | 6/2017 | Lauder |
| 2017/0190436 A1 | 7/2017 | Ullman et al. |
| 2017/0197700 A1 | 7/2017 | Wainfan |
| 2017/0203839 A1 | 7/2017 | Giannini et al. |
| 2017/0217575 A1 | 8/2017 | Welsh et al. |
| 2017/0217581 A1 | 8/2017 | Hunter et al. |
| 2017/0217582 A1 | 8/2017 | Bredenbeck et al. |
| 2017/0220048 A1 | 8/2017 | Eadie et al. |
| 2017/0225775 A1 | 8/2017 | Eadie et al. |
| 2017/0225797 A1 | 8/2017 | Bredenbeck et al. |
| 2017/0233055 A1 | 8/2017 | Brutoco |
| 2017/0233067 A1 | 8/2017 | Eller et al. |
| 2017/0233068 A1 | 8/2017 | Eller et al. |
| 2017/0233081 A1 | 8/2017 | Sautron et al. |
| 2017/0240275 A1 | 8/2017 | Evulet |
| 2017/0248125 A1 | 8/2017 | Luchsinger et al. |
| 2017/0263136 A1 | 9/2017 | Navot et al. |
| 2017/0267338 A1 | 9/2017 | Garcia et al. |
| 2017/0274981 A1 | 9/2017 | Shiosaki et al. |
| 2017/0274987 A1 | 9/2017 | Bredenbeck et al. |
| 2017/0274990 A1 | 9/2017 | Eadie et al. |
| 2017/0274994 A1 | 9/2017 | Eller et al. |
| 2017/0274996 A1 | 9/2017 | Frolov et al. |
| 2017/0275014 A1 | 9/2017 | Eadie et al. |
| 2017/0277201 A1 | 9/2017 | Bredenbeck et al. |
| 2017/0283045 A1 | 10/2017 | Garcia et al. |
| 2017/0283046 A1 | 10/2017 | Egolf et al. |
| 2017/0283047 A1 | 10/2017 | Weiner et al. |
| 2017/0283048 A1 | 10/2017 | Beckman et al. |
| 2017/0283049 A1 | 10/2017 | Weiner |
| 2017/0283055 A1 | 10/2017 | Aguilar |
| 2017/0283080 A1 | 10/2017 | Evulet |
| 2017/0291699 A1 | 10/2017 | Hunter et al. |
| 2017/0291702 A1 | 10/2017 | Eller et al. |
| 2017/0297690 A1 | 10/2017 | Weiner et al. |
| 2017/0297692 A1 | 10/2017 | Eadie et al. |
| 2017/0297696 A1 | 10/2017 | Weiner |
| 2017/0300051 A1 | 10/2017 | Zhou et al. |
| 2017/0305534 A1 | 10/2017 | Bredenbeck et al. |
| 2017/0305539 A1 | 10/2017 | Alber et al. |
| 2017/0305540 A1 | 10/2017 | Eller et al. |
| 2017/0305543 A1 | 10/2017 | Moffitt et al. |
| 2017/0305544 A1 | 10/2017 | Eadie et al. |
| 2017/0308101 A1 | 10/2017 | Luszcz et al. |
| 2017/0315563 A1 | 11/2017 | Wulff |
| 2017/0349275 A1 | 12/2017 | Eller et al. |
| 2017/0355455 A1 | 12/2017 | Taylor et al. |

FOREIGN PATENT DOCUMENTS

| | | |
|---|---|---|
| AU | 2015203190 A1 | 1/2016 |
| BG | 65742 B1 | 9/2009 |
| CA | 1310942 C | 12/1992 |
| CA | 2141481 A1 | 8/1996 |
| CA | 2338852 A1 | 9/2002 |
| CA | 2471887 A1 | 12/2005 |
| CA | 2543912 A1 | 10/2007 |
| CA | 2776121 A1 | 10/2013 |
| CN | 1204288 A | 1/1999 |
| CN | 1240745 A | 1/2000 |
| CN | 1074373 C | 11/2001 |
| CN | 1342589 A | 4/2002 |
| CN | 2542560 Y | 4/2003 |
| CN | 2542561 Y | 4/2003 |
| CN | 2753673 Y | 1/2006 |
| CN | 100354182 C | 12/2007 |
| CN | 101353084 A | 1/2009 |
| CN | 101503114 A | 8/2009 |
| CN | 201371937 Y | 12/2009 |
| CN | 102167163 A | 8/2011 |
| CN | 201923320 U | 8/2011 |
| CN | 102444500 A | 5/2012 |
| CN | 202499129 U | 10/2012 |
| CN | 202508281 U | 10/2012 |
| CN | 102765481 A | 11/2012 |
| CN | 103057694 A | 4/2013 |
| CN | 103057703 A | 4/2013 |
| CN | 103171764 A | 6/2013 |
| CN | 104129500 A | 11/2014 |
| CN | 102991669 B | 12/2014 |
| CN | 104401480 A | 3/2015 |
| CN | 104816823 A | 8/2015 |
| CN | 204623838 U | 9/2015 |
| CN | 105035306 A | 11/2015 |
| CN | 103395491 B | 12/2015 |
| CN | 103612751 B | 12/2015 |
| CN | 105460215 A | 4/2016 |
| CN | 105667781 A | 6/2016 |
| CN | 103192989 B | 8/2016 |
| CN | 106043685 A | 10/2016 |
| CN | 205633041 U | 10/2016 |
| CN | 105649775 B | 6/2017 |
| CN | 106828915 A | 6/2017 |
| CN | 106864746 A | 6/2017 |
| CN | 206265280 U | 6/2017 |
| CN | 106938701 A | 7/2017 |
| CN | 105059542 B | 9/2017 |
| CN | 107364571 A | 11/2017 |
| CN | 107401956 A | 11/2017 |
| DE | 4405975 A1 | 8/1995 |
| DE | 10126632 A1 | 9/2002 |
| DE | 102007048942 A1 | 4/2009 |
| DE | 102008044856 A1 | 3/2010 |
| EP | 327371 B1 | 5/1993 |
| EP | 796196 A1 | 9/1997 |
| EP | 797723 A1 | 10/1997 |
| EP | 960812 A1 | 12/1999 |
| EP | 999965 A1 | 5/2000 |
| EP | 1409875 A1 | 4/2004 |
| EP | 1574426 A1 | 9/2005 |
| EP | 1755945 A2 | 2/2007 |
| EP | 2527218 A1 | 11/2012 |
| EP | 2690012 A1 | 1/2014 |
| EP | 3007974 A1 | 4/2016 |
| EP | 3085619 A1 | 10/2016 |
| EP | 3162701 A1 | 5/2017 |

(56) References Cited

FOREIGN PATENT DOCUMENTS

| | | |
|---|---|---|
| EP | 3243745 A1 | 11/2017 |
| EP | 3243747 A1 | 11/2017 |
| EP | 3243750 A1 | 11/2017 |
| FR | 2880867 A1 | 7/2006 |
| FR | 3036140 A1 | 11/2016 |
| FR | 3036144 A1 | 11/2016 |
| GB | 2264907 A | 9/1993 |
| GB | 2249140 B | 12/1994 |
| GB | 2312709 A | 11/1997 |
| GB | 2342079 B | 10/2002 |
| GB | 2379483 A | 3/2003 |
| GB | 2390884 A | 1/2004 |
| GB | 2397809 A | 8/2004 |
| GB | 2398046 B | 7/2006 |
| GB | 2451347 B | 9/2009 |
| GB | 2461051 A | 12/2009 |
| GB | 2438848 B | 8/2011 |
| GB | 2478570 B | 2/2012 |
| IN | 201302310 P2 | 4/2014 |
| IN | 201500081 P3 | 7/2016 |
| JP | 6099899 A | 4/1994 |
| JP | 6329096 A | 11/1994 |
| JP | 7002188 A | 1/1995 |
| JP | 9011991 A | 1/1997 |
| JP | 11082173 A | 3/1999 |
| JP | 2006300040 A | 11/2006 |
| JP | 2006315647 A | 11/2006 |
| JP | 2006528583 A | 12/2006 |
| JP | 4081550 B2 | 4/2008 |
| JP | 2009029400 A | 2/2009 |
| JP | 2009083798 A | 4/2009 |
| JP | 2010111216 A | 5/2010 |
| JP | 4478509 B2 | 6/2010 |
| JP | 2010120420 A | 6/2010 |
| JP | 2016185740 A | 10/2016 |
| KR | 472560 B1 | 3/2005 |
| KR | 2005088032 A | 9/2005 |
| KR | 2015018018 A | 2/2015 |
| KR | 2015055202 A | 5/2015 |
| KR | 1646736 B1 | 8/2016 |
| KR | 1660759 B1 | 9/2016 |
| KR | 2017061259 A | 6/2017 |
| KR | 2017063027 A | 6/2017 |
| KR | 2017090936 A | 8/2017 |
| RO | 128282 A2 | 4/2013 |
| RO | 128283 A2 | 4/2013 |
| RO | 126028 B1 | 11/2013 |
| RU | 2123963 C1 | 12/1998 |
| RU | 2130863 C1 | 5/1999 |
| RU | 2151717 C1 | 6/2000 |
| RU | 2174484 C2 | 10/2001 |
| RU | 2205760 C1 | 6/2003 |
| RU | 2320518 C1 | 3/2008 |
| RU | 2325307 C1 | 5/2008 |
| RU | 2394723 C1 | 7/2010 |
| RU | 2401771 C2 | 10/2010 |
| RU | 2419557 C2 | 5/2011 |
| RU | 2500578 C1 | 12/2013 |
| RU | 2518143 C2 | 6/2014 |
| RU | 2531432 C2 | 10/2014 |
| RU | 2568234 C2 | 11/2015 |
| RU | 171505 U1 | 6/2017 |
| RU | 2627965 C1 | 8/2017 |
| RU | 2629475 C1 | 8/2017 |
| RU | 174731 U1 | 10/2017 |
| RU | 2636826 C1 | 11/2017 |
| RU | 2016117529 A | 11/2017 |
| SG | 130968 A1 | 4/2007 |
| UA | 94184 U | 11/2014 |
| WO | 1992021862 A1 | 12/1992 |
| WO | 1999033690 A1 | 7/1999 |
| WO | 1999054181 A2 | 10/1999 |
| WO | 2000001576 A2 | 1/2000 |
| WO | 2000002776 A1 | 1/2000 |
| WO | 2001051354 A1 | 7/2001 |
| WO | 2003016638 A1 | 2/2003 |
| WO | 2003020584 A1 | 3/2003 |
| WO | 2003076224 A2 | 9/2003 |
| WO | 2005007506 A2 | 1/2005 |
| WO | 2005067413 A2 | 7/2005 |
| WO | 2005085620 A1 | 9/2005 |
| WO | 2007022315 A2 | 2/2007 |
| WO | 2007043908 A1 | 4/2007 |
| WO | 2007108794 A1 | 9/2007 |
| WO | 2008044941 A2 | 4/2008 |
| WO | 2009027742 A1 | 3/2009 |
| WO | 2009068835 A1 | 6/2009 |
| WO | 2010024725 A1 | 3/2010 |
| WO | 2010132901 A1 | 11/2010 |
| WO | 2011004187 A2 | 1/2011 |
| WO | 2011010155 A2 | 1/2011 |
| WO | 2011041991 A2 | 4/2011 |
| WO | 2013012316 A1 | 1/2013 |
| WO | 2014058351 A2 | 4/2014 |
| WO | 2015030630 A1 | 3/2015 |
| WO | 2015133932 A2 | 9/2015 |
| WO | 2016110756 A1 | 7/2016 |
| WO | 2016124761 A1 | 8/2016 |
| WO | 2016126231 A1 | 8/2016 |
| WO | 2017105266 A1 | 6/2017 |
| WO | 2017132515 A2 | 8/2017 |
| WO | 2017153807 A1 | 9/2017 |
| WO | 2017158417 A1 | 9/2017 |
| WO | 2017178899 A2 | 10/2017 |
| WO | 2017180020 A1 | 10/2017 |
| WO | 2017209820 A2 | 12/2017 |
| WO | 2017210595 A2 | 12/2017 |

OTHER PUBLICATIONS

S L Williams, M E Franke, "Navier-Stokes Methods to Predict Circulation Control Airfoil Performance", Journal of aircraft, 1992, pp. 243-249, vol. 29, Issue No. 2, Ohio, USA.

NARK TEDC, "Design, development, and flight evaluation of the Boeing YC-14 USB powered lift aircraft", AGARD, High-Lift System Aerodynamics, 1993, pp. 1-30 Issue No. 515, Canada.

Robert J Englar, Marilyn J Smith, Sean M Kelley, Richard C Rover, "Development of circulation control technology for application to advanced subsonic transport aircraft", 31st Aerospace Sciences Meeting, 1993, pp. 1-14, Atlanta, USA.

Plaetschke E, Weiss S, "Identification of thrust vector effectiveness from X-31A flight test data", Zeitschrift fur flugwissenschaften und weltraumforschung, 1993, pp. 235-238, vol. 17, Issue No. 4, Germany.

All Zandieh, J Gordon Leishman, "Boundary Layer and Pressure Measurements on a Cylinder with Unsteady Circulation Control", AIAA Journal, 1993, pp. 1769-1776, vol. 31, Issue No. 10, USA.

Buffington JM, Sparks AG, Banda SS, "Robust longitudinal axis flight control for an aircraft with thrust vectoring", Automatica, 1994, pp. 1527-1540, vol. 30, Issue No. 10, USA.

Robert J Englar, Marilyn J Smith, Scan M Kelley, Richard C Rover, "Application of Circulation Control to Advanced Subsonic Transport Aircraft, Part I: Airfoil Development", Journal of aircraft, 1994, pp. 1160-1168, vol. 31, Issue No. 5, Atlanta, USA.

Robert J Englar, Marilyn J Smith, Scan M Kelley, Richard C Rover, "Application of Circulation Control to Advanced Subsonic Transport Aircraft, Part II: Transport Application", Journal of aircraft, 1994, pp. 1169-1177, vol. 31, Issue No. 5, Atlanta, USA.

Liu Jing Chang, Sun Mao, Wu Liyi, "Navier-stokes analysis of a circulation control airfoil", Acta Mechanica Sinica, 1995, pp. 137-143, vol. 11, Issue No. 2, Beijing, China.

J C Tai, D N Mavris, D P Schrage, "Application of a response surface method to the design of tip jet driven stopped rotorwing concepts", 1st AIAA Aircraft Engineering, Technology and Operations Congress, 1995, pp. 1-13, USA.

Galor B, "Thrust vector control eyed for passenger aircraft: A novel methodology to combine jet-engine tests with sub-scale proof-of-concept flight tests", International journal of turbo & jet-engines, 1995, pp. 241-251, vol. 12, Issue No. 4, Haifa, Israel.

(56) References Cited

OTHER PUBLICATIONS

Steen Toffner-Clausen, "u Control of an Ill-Conditioned Aircraft", System Identification and Robust Control, 1996, pp. 99-119, Denmark.

Holger Friehmelt, "Elements of Aerodynamic Model Validation for Delta-Canard Configured Aircraft with Thrust-Vectoring", IFAC Proceedings Volumes, 1997, pp. 395-400, vol. 30, Issue No. 11, Braunschweig, Germany.

John Pike, "Dragonfly Canard-Rotor-Wing UAV", Federation of American Scientists, 1997, pp. 1-2, USA.

Michiel J Van Nieuwstadt, Richard M Murray, "Rapid hover-to-forward-flight transitions for a thrust-vectored aircraft", Journal of guidance control and dynamics, 1998, pp. 93-100, vol. 21, Issue No. 1, Pasadena, California.

"Developing a thrust vectoring system for transport aircraft—A VSTOL transport aircraft provides many challenges in stability and control", Aerospace engineering—warrendale, 1998, pp. 16-25, vol. 18, Issue No. 1-2, USA.

Arkadi Lichtsinder, Eliezer Kreindler, Benjamin Gal-Or, "Minimum-time maneuvers of thrust-vectored aircraft", Journal of guidance control and dynamics, 1998, pp. 244-250, vol. 21, Issue No. 2, Haifa, Israel.

Liseitsev NK, Ardzhomandi M, "Influence of engine thrust vector turn on the transport aircraft takeoff distance length", International journal of turbo & jet-engines, 1999, pp. 3-5 Issue No. 2, Russia.

F S Alvi, P J Strykowski, "Forward Flight Effects on Counterflow Thrust Vector Control of a Supersonic Jet", AIAA Journal, 1999, pp. 279-281, vol. 37, Florida, USA.

Hollmeier S, Kopp S, Herrmann O, Rick H, "Propulsion / Aircraft Integration of Hypersonic Vehicles with Active Thrust-Vectoring and Real-Time Simulation of Dynamic Engine Behaviour", International journal of turbo & jet-engines, 1999, pp. 207-222, vol. 16, Issue No. 4, Germany.

R G Simpson, N A Ahmed, R D Archer, "Improvement of a wing's aerodynamic efficiency using coanda tip jets", Journal of aircraft, 2000, pp. 183-184, vol. 37, Australia.

H Kim, S Raghunathan, T Setoguchi, S Matsuo, "Experimental and numerical studies of supersonic coanda wall jets", 38th Aerospace Sciences Meeting and ExhibitA, 2000, pp. 1-8, USA.

S A Pandya, M J Aftosmis, "Computation of external aerodynamics for a canard rotor/wing aircraft", 39th AIAA Aerospace Sciences Meeting and Exhibit, 2000, pp. 1-9, California, USA.

J R Potts, W J Crowther, "Flight Control of a Spin Stabilised Axi-symmetric Disc-wing", 39th Aerospace Sciences Meeting & Exhibit, 2001, pp. 1-10, USA.

Alan Nurick, "Experimental Investigation of a Helicopter Circulation-Controlled Tail Boom", Journal of aircraft, 2001, pp. 528-535, vol. 38, South Africa.

E Stanewsky, "Adaptive wing and flow control technology", Progress in Aerospace Sciences, 2001, pp. 583-667, vol. 37, Issue No. 7, Germany.

Mark D Moore, "Personal Air Vehicle Exploration (PAVE)", NASA Langley Research Center, 2002, pp. 1-48, USA.

J F Slomski, J J Gorski, R W Miller, T A Marino, "Numerical Simulation of Circulation Control Airfoils as Affected by Different Turbulence Models", 40th AIAA Aerospace Sciences Meeting & Exhibit, 2002, pp. 1-11, Nevada, USA.

R J Collins, "Coanda—a new airspace platform for UAVs", International conference; 17th, UAVs; Unmanned air vehicle systems, 2002, pp. 1-10, Bristol, UK.

Mark S Mason, William J Crowther, "Fluidic thrust vectoring of low observable aircraft", CEAS Aerospace Aerodynamic Research Conference, 2002, pp. 1-7, Manchester, USA.

Nick Sellars, Andrew Kennaugh, Norman Wood, "Delta wing circulation control using the coanda effect", 1st Flow Control Conference, 2002, pp. 1-11, UK.

G S Jones, S A Viken, A E Washburn, L N Jenkins, C M Cagle, "An Active Flow Circulation Controlled Flap Concept for General Aviation Aircraft Applications", 1st Flow Control Conference, 2002, pp. 1-18, USA.

Robert J Englar, Bryan A Campbell, "Pneumatic channel wing powered-lift advanced superSTOL aircraft", 1st Flow Control Conference, 2002, pp. 1-10, Atlanta, USA.

Christopher Cagle, Gregory S Jones, "A Wind Tunnel Model to Explore Unsteady Circulation Control for General Aviation Applications", 22nd AIAA Aerodynamic Measurement Technology and Ground Testing Conference, 2002, pp. 1-12, Missouri, USA.

Gregory S Jones, Robert J Englar, "Advances in Pneumatic-Controlled High-Lift Systems Through Pulsed Blowing", AIAA Journal, 2003, pp. 1-14, USA.

Yi Liu, "Numerical simulations of the aerodynamic characteristics of circulation control wing sections", Georgia Institute of Technology, 2003, pp. 1-172, Atlanta, USA.

M Orchard, S Newman, "The fundamental configuration and design of the compound helicopter", Proceedings of the institution of mechanical engineers, part g: journal of aerospace engineering, 2003, pp. 297-315, vol. 217, Issue No. 6, UK.

Clark Mitchell, Barbara Vogel, "The Canard Rotor Wing (CRW) Aircraft—A New Way to Fly", AIAA International Air and Space Symposium and Exposition, 2003, pp. 1-11, USA.

Slomski J, Marino T A, "Low-speed maneuverability.", Military Engineer, 2003, pp. 1-37, vol. 95, Issue No. 624, Alexandria, USA.

Rogers Ernest O, Donnelly Martin J, "Characteristics of a Dual-Slotted Circulation Control Wing of Low Aspect Ratio Intended for Naval Hydrodynamic Applications", 42nd AIAA Aerospace Sciences Meeting and Exhibit, 2004, pp. 1-29, USA.

Yi Liu, Lakshmi N Sankar, Robert J Englar, Krishan K Ahuja, R Gaeta, "Computational Evaluation of the Steady and Pulsed Jet Effects on the Performance of a Circulation Control Wing Section", 42nd AIAA Aerospace Sciences Meeting and Exhibit, 2004, pp. 1-15, Atlanta, USA.

Jingshu Wu, Lakshmi Sankar, Shayne Kondor, "Numerical modeling of coanda jet controlled nacelle configurations", Aerospace Sciences Meetings, 2004, pp. 1-9, Nevada, USA.

Peter A Chang, Joseph Slomski, Thomas Marino, Michael P Ebert, "Numerical Simulation of Two- and Three-Dimensional Circulation Control Problems", 43rd AIAA Aerospace Sciences Meeting and Exhibit, 2004, pp. 1-25, Nevada, USA.

Abramson Jane, "Characteristics of a cambered circulation control airfoil having both upper and lower surface trailing edge slots", Defense technical information center, 2004, pp. 1-85, Maryland, USA.

Steven P Frith, Norman J Wood, "Investigation of Dual Circulation Control Surfaces for Flight Control", 2nd AIAA Flow Control Conference, 2004, pp. 1-8, Oregon, USA.

Cezar Dorin Galeriu, Adriana Sida Manea, "Numerical analysis of coanda airfoils in sub and transonic regime", The 6th international conference on hydraulic machinery and hydrodynamics, 2004, pp. 609-618, Timisoara, Romania.

Knepper, Angela Marie, "Examination of three candidate technologies for high-lift devices on an aircraft wing", Cranfield University, 2005, pp. 1-400, USA.

Robert J Englar, "Overview of Circulation Control Pneumatic Aerodynamics: Blown Force and Moment Augmentation and Modification as Applied Primarily to Fixed-Wing Aircraft", Progress in Astronautics and Aeronautics, 2005, pp. 23-68, Atlanta, USA.

Steven P Frith, Norman J Wood, "Use of Circulation Control for Flight Control", Astronautics and Aeronautics, 2005, pp. 337-356, UK.

Pierce Julia, "Blow for inefficient aerodynamics", Engineer, 2005, pp. 1-14, vol. 293, Issue No. 7666, London, UK.

Robert J Englar, Bryan A Campbell, "Experimental Development and Evaluation of Pneumatic Powered-Lift Super-STOL Aircraft", Astronautics and Aeronautics, 2005, pp. 315-336, Virginia, USA.

Jones Gregory S, "Pneumatic Flap Performance for a 2D Circulation Control Airfoil, Steady & Pulsed", Applications of Circulation Control Technology (Progress in Astronautics and Aeronauticse), 2005, pp. 845-888, USA.

E L Tu, "Numerical study of the close-coupled canard-wing-body aerodynamic interaction", Thirteenth International Conference on Numerical Methods in Fluid Dynamics, 2005, pp. 483-487, USA.

(56) References Cited

OTHER PUBLICATIONS

Kannan N, Bhat MS, "Longitudinal H-infinity stability augmentation system for a thrust-vectored unmanned aircraft", Journal of guidance control and dynamics, 2005, pp. 1240-1250, vol. 28, Issue No. 6, Bangalore, India.

A Buonanno, M V Cook, "Flight dynamic simulation of a flapless flight control UAV", 25th international congress of the aeronautical sciences, 2006, pp. 1-11, UK.

Fasel Hermann F, Gross Andreas, Wernz Stefan, "Investigation of Turbulent Coanda Wall Jets Using DNS and RANS", Applications of Circulation Control Technology, 2006, pp. 401-420, Arizona, USA.

Coppinger Rob, "UK MoD sees Coanda UAV flights", Flight International, 2006, pp. 1-25, vol. 169, Issue No. 5027, London, UK.

Geoffrey Lilley, "Circulation Control for Quiet Commercial Aircraft", 3rd AIAA Flow Control Conference, 2006, pp. 1-16, California, USA.

Gregory Jones, Chung-Sheng Yao, Brian Allan, "Experimental Investigation of a 2D Supercritical Circulation-Control Airfoil Using Particle Image Velocimetry", 3rd AIAA Flow Control Conference, 2006, pp. 1-20, Virginia, USA.

Keiichi Okai, Hiroshi Nomura, Takeshi Tagashira, Ryoji Yanagi, "Electromagnetic-Driving Fan for Aircraft-Propulsion Application", 4th International Energy Conversion Engineering Conference and Exhibit (IECEC), 2006, pp. 1-11, California, USA.

Messam Abbas Naqvi, "Prediction of Circulation Control Performance Characteristics for Super STOL & STOL Applications", In Partial Fulfillment of the Requirements for the Degree, 2006, pp. 1-249, USA.

Andreas Gross, Hermann Fasel, "Coanda Wall Jet Calculations Using One- and Two-Equation Turbulence Models", AIAA Journal, 2006, pp. 2095-2107, vol. 44, Issue No. 9, Arizona, USA.

M Mamou, M Khalid, "Steady and unsteady flow simulation of a combined jet flap and Coanda jet effects on a 2D airfoil aerodynamic performance", Revue des Energies Renouvelables, 2007, pp. 55-60, Ontario, Canada.

De La Montanya, Julianna B, Marshall, David D, "Circulation Control and Its Application to Extreme Short Take-Off and Landing Vehicles", 45th AIAA Aerospace Sciences Meeting and Exhibit, 2007, pp. 1-19, California, USA.

Ali T Kutay, John R Culp, Jonathan A Muse, Daniel P Brzozowski, Ari Glezer, Anthony J Calise, "A Closed-Loop Flight Control Experiment using Active Flow Control Actuators", 45th AIAA Aerospace Sciences Meeting and Exhibit, 2007, pp. 1-16, Atlanta, USA.

Hassan Nagib, John Kiedaisch, Paul Rienhard, Brian Demanett, "Active Flow Control for High Lift Airfoils: Separation Versus Circulation Control", 45th AIAA Aerospace Sciences Meeting and Exhibit, 2007, pp. 1-20, Nevada, USA.

Hugh Edward Hill, "2D CFD Simulation of a Circulation Control Inlet Guide Vane", ETDs: Virginia Tech Electronic Theses and Dissertations, 2007, pp. 1-100, Virginia, USA.

H E Hill, W F Ng, P P Vlachos, S A Guillot, D Car, "2D Parametric Study Using CFD of a Circulation Control Inlet Guide Vane", ASME Turbo Expo 2007: Power for Land, Sea and Air, 2007, pp. 1405-1413, vol. 6, Montreal, Canada.

Ralf Petz, Wolfgang Nitsche, "Active Separation Control on the Flap of a Two-Dimensional Generic High-Lift Configuration", Journal of aircraft, 2007, pp. 865-874, vol. 44, Issue No. 3, Germany.

K C Pfingsten, C Jensch, K W Korber, R Radespie, "Numerical simulation of the flow around circulation control airfoils", First CEAS European Air and Space Conference, 2007, pp. 1-15, Braunschweig, Germany.

K C Pfingsten, R Radespiel, "Numerical simulation of a wing with a gapless high-lift system using circulation control", New Results in Numerical and Experimental Fluid Mechanics, 2007, pp. 71-79, Braunschweig, Germany.

Nikolaos Kehayas, "Aeronautical technology for future subsonic civil transport aircraft", Aircraft Engineering and Aerospace Technology, 2007, pp. 600-610, vol. 79, Issue No. 6, Greece.

D-W Gu, K Natesan, I Postlethwaite, "Modelling and robust control of fluidic thrust vectoring and circulation control for unmanned air vehicles", Proceedings of the institution of mechanical engineers part i-journal of systems and control engineering, 2007, pp. 333-345, vol. 222, Issue No. 5, Leicester, UK.

Tyler Ball, Scott Turner, David D Marshall, "Short Takeoff Performance using Circulation Control", 46th AIAA Aerospace Sciences Meeting and Exhibit, 2008, pp. 1-21, USA.

Landolfo, Giuseppe, "Aerodynamic and structural design of a small nonplanar wing UAV", 47th AIAA Aerospace Sciences Meeting Including the New Horizons Forum and Aerospace Exposition, 2008, pp. 1-147, Ohio, USA.

Gerald Angle, Jonathan Kweder, Meagan Hubbell, Jay Wilhelm, James E Smith, "Experimental Investigation into a 10:1 Elliptical Airfoil with Circulation Control Augmentation for Rotorcraft Use", 4th Flow Control Conference, 2008, pp. 1-7, Seattle, USA.

M V Cook, A Buonanno, S D Erbsloh, "A circulation control actuator for flapless flight control", The Aeronautical Journal, 2008, pp. 483-489, vol. 112, Issue No. 1134, Cranfield, UK.

P I A Wilde, W J Crowther, A Buonanno, A Savvaris, "Aircraft Control Using Fluidic Maneuver Effectors", 26th AIAA Applied Aerodynamics Conference, 2008, pp. 1-12, Hawaii, USA.

Coppinger Rob, "Autonomous coanda-effect UAV flight due by year-end", Flight International, 2008, p. 26, vol. 174, Issue No. 5154, Salisbury, UK.

Sang Hoon Kim, Chongam Kim, "Separation control on NACA23012 using synthetic jet", Aerospace science and technology, 2008, pp. 172-182, vol. 13, Issue No. 4-5, South Korea.

Brendan A Blake, "Numerical investigation of Fluidic Injection as a means of Thrust Modulation", Final Thesis Report 2009, 2009, pp. 1-29, Australia.

R Radespiel, K C Pfingsten, C Jensch, "Flow analysis of augmented high-lift system", Hermann Schlichting—100 Years pp. 168-189, 2009, pp. 168-189, Braunschweig, Germany.

C Jensch, K C Pfingsten, R Radespiel, M Schuermann, M Haupt, S Bauss, "Design aspects of a gapless high-lift system with active blowing", Proceedings German Aerospace Congress, 2009, pp. 1-8, Germany.

Brendan A Blake, "Numerical investigation of Fluidic Injection as a means of thrust control", Initial Thesis Report 2009, ACME, UNSW@ADFA, 2009, pp. 1-10, vol. 2, USA.

Bill Gunston, The Cambridge Aerospace Dictionary, 2009, pp. 1-818, New York.

Gaurav Agarwal, Othon Rediniotis, Yogesh Babbar, "Effectiveness of Trailing Edge Active Flow Control on Pitch Control of an Unmanned Aerial Vehicle", 47th AIAA Aerospace Sciences Meeting Including the New Horizons Forum and Aerospace Exposition, 2009, pp. 1-14, Orlando, USA.

Mark Waters, Cassy Anthony, Gregory McKenzie, David D Marshall, "Propulsion System Modeling and Takeoff Distance Calculations for a Powered-Lift Aircraft with Circulation-Control Wing Aerodynamics", 47th AIAA Aerospace Sciences Meeting Including the New Horizons Forum and Aerospace Exposition, 2009, pp. 1-22, Orlando, USA.

G Zha, J J Dussling, S Aspe, N R Heinz, D J Martinez, "Quiet Ultra-Efficient Integrated Aircraft Using Co-Flow Jet Flow Control", 47th AIAA Aerospace Sciences Meeting Including the New Horizons Forum and Aerospace Exposition, 2009, pp. 1-15, Orlando, USA.

Robert Englar, Gregory Jones, Brian Allan, John Lin, "2-D Circulation Control Airfoil Benchmark Experiments Intended for CFD Code Validation", 47th AIAA Aerospace Sciences Meeting including the New Horizons Forum and Aerospace Exposition, 2009, pp. 1-27, Orlando, USA.

Thong Q Dang, Peter R Bushnell, "Aerodynamics of cross-flow fans and their application to aircraft propulsion and flow control", Progress in Aerospace Sciences, 2009, pp. 1-29, vol. 45, Issue No. 1-3, USA.

Sandra L Gunter, Stephen A Guillot, Wing F Ng, S Todd Bailie, "A three-dimensional CFD design study of a circulation control inlet

(56) References Cited

OTHER PUBLICATIONS guide vane for a transonic compressor", Proceedings of ASME Turbo Expo 2009: Power for Land, Sea and Air, 2009, pp. 91-101, vol. 7, Florida, USA.
D Mueller, H A Bruck, S K Gupta, "Measurement of Thrust and Lift Forces Associated With Drag of Compliant Flapping Wing for Micro Air Vehicles Using a New Test Stand Design", Experimental Mechanics, 2009, pp. 725-735, vol. 50, Issue No. 6, USA.
Marcel Schroijen, Michel Van Tooren, "Mav propulsion system using the coanda effect", 45th AIAA/ASME/SAE/ASEE Joint Propulsion Conference & Exhibit, 2009, pp. 1-10, Denver, Colorado.
"Aesir unveils Hoder for resupply duties", Flight International, 2009, p. 22, vol. 176, Issue No. 5200, USA.
Corin Gologan, Sebastian Mores, Hans-Jorg Steiner, Arne Seitz, "Potential of the Cross-Flow Fan for Powered-Lift Regional Aircraft Applications", 9th AIAA Aviation Technology, Integration, and Operations Conference (ATIO), 2009, pp. 1-10, South Carolina, USA.
K B Lim, W B Tay, "Numerical analysis of the s1020 airfoils in tandem under different flapping configurations", Acta Mechanica Sinica, 2009, pp. 191-207, vol. 26, Issue No. 2, Singapore.
C Barlow, D Lewis, S D Prior, S Odedra, M Erbil, M Karamanoglu, R Collins, "Investigating the use of the Coanda Effect to create novel unmanned aerial vehicles", International Conference on Manufacturing and Engineering Systems, 2009, pp. 386-391, London, UK.
Kan Xie, Yu Liu, Jianren Xin, "Controlled canard configuration study for a solid rocket motor based unmanned air vehicle", Journal of mechanical science and technology, 2009, pp. 3271-3280, vol. 23, Issue No. 12, Beijing, China.
Corneliu Berbente, "Scientific personality of Henri Coanda", Anniversary Session Celebrating 100 year of the first jet aircraft invented by Henri Coanda, 2010, pp. 3-10, vol. 2, Bucharest, Romania.
George T K Woo, Ari Glezer, "Transitory control of dynamic stall on a pitching airfoil", Active Flow Control, 2010, pp. 3-18, Atlanta, USA.
C Jensch, K C Pfingsten, R Radespiel, "Numerical investigation of leading edge blowing and optimization of the slot geometry for a circulation control airfoil", New Results in Numerical and Experimental Fluid Mechanics, 2010, pp. 183-190, Braunschweig, Germany.
Kunihiko Taira, Clarence W Rowley, Tim Colonius, "Lock-on to a high-lift state with oscillatory forcing in a three-dimensional wake flow", Active Flow Control, 2010, pp. 81-93, Princeton, USA.
Jonathan Kweder, Chad C Panther, James E Smith, "Applications of Circulation Control, Yesterday and Today", International Journal of Engineering, 2010, pp. 411-429, vol. 4, Issue No. 5, USA.
Michael Pott-Pollenske, Kai-Christoph Pfingsten, "Aeroacoustic Performance of an Airfoil with Circulation Control", 16th AIAA/CEAS Aeroacoustics Conference, 2010, pp. 1-22, Germany.
Richard Gaeta, Russell Young, "Development of a Noise Prediction Model for a Cruise Friendly Circulation Control Wing", 16th AIAA/CEAS Aeroacoustics Conference, 2010, pp. 1-14, Atlanta, USA.
Sorin Dinea, Ioan Vasile Buiu, Dan Antoniu, Paul Sandachi, Tiberiu Constantinescu, "coanda 1910 jet aircraft—the first jet aircraft of the world", Review of the Air Force Academy, 2010, pp. 7-13, Romania.
Rory M Golden, David D Marshall, "Design and Performance of Circulation Control Flap Systems", 48th AIAA Aerospace Sciences Meeting Including the New Horizons Forum and Aerospace Exposition, 2010, pp. 1-27, San Luis Obispo, California.
Robert Englar, Graham Blaylock, Richard Gaeta, Gregory Jones "Recent Experimental Development of Circulation Control Airfoils and Pneumatic Powered-Lift Systems", 48th AIAA Aerospace Sciences Meeting Including the New Horizons Forum and Aerospace Exposition, 2010, pp. 1-32, Orlando, USA.
Yang Zhigang, Yang Wei, "Complex flow for wing-in-ground effect craft with power augmented ram engine in cruise", Chinese Journal of Aeronautics, 2010, pp. 1-8, vol. 23, Issue No. 1, China.
Kunihiko Taira, Clarence W Rowley, Tim Colonius, David R Williams, "Lift Enhancement for Low-Aspect-Ratio Wings with Periodic Excitation", AIAA Journal, 2010, pp. 1785-1790, vol. 48, Pasadena, California.
Wilde Pia, Crowther WJ, Harley CD, "Application of circulation control for three-axis control of a tailless flight vehicle", Proceedings of the institution of mechanical engineers, part g: journal of aerospace engineering, 2010, pp. 373-386, vol. 224, Issue No. 4, Manchester, UK.
Buonanno A, Drikakis D, Papachristou C, Savvaris A, Vamvakoulas C, Warsop C, "Computational investigation of the DEMON unmanned air vehicle thrust vectoring system", Proceedings of the institution of mechanical engineers, part g: journal of aerospace engineering, 2010, pp. 387-394, vol. 224, Issue No. 4, UK.
Travis Marshall Storm, "Assessing the v2-f turbulence models for circulation control applications", Unpublished master's thesis, 2010, pp. 1-82, San Luis Obispo, USA.
N R Alley, J Steele, J C Neidhoefer, J Englar, G Blaylock, "Development of a Cruise-Efficient Extreme-STOL-Capable Demonstrator UAV", AIAA Infotech—Aerospace, 2010, pp. 1-14, Atlanta, USA.
Florin Nedelcut, "Towards a new class of aerial vehicles using the coanda effect", 12th International Conference of Scientific Papers, Scientific Research and Education in the Air Force, 2010, pp. 1-8, Romania.
Zhang Guoqing, Yang Shuxing, Xu Yong, "Investigation of Vortex Interaction in Canard-FSW Configurations Based on the Numerical Wind Tunnel Method", Chinese Journal of Aeronautics, 2010, pp. 312-319, vol. 23, Issue No. 3, China.
Florescu Daniela, Florescu Iulian, Nedelcut Florin, Nedelcu Iulian, "Fuselage airstream simulation for a coanda UAV", Review of the Air Force Academy, 2010, pp. 83-87, vol. 17, Issue No. 2, USA.
Takafumi Nishino, Seonghyeon Hahn, Karim Shariff, "LES of high-Reynolds-number Coanda flow separating from a rounded trailing edge of a circulation control airfoil", 8th International ERCOFTAC Symposium on Engineering Turbulence Modelling and Measurements, 2010, pp. 1-27, USA.
Julian Tan Kok Ping, Saukeong Ban, Chingseong Tan, Thomas Ting Shee Peng, Ng Chin Soon, "Preliminary design of vertical take-off and landing (vtol) uav with steerable vertical thrust effect", Robotics Automation and Mechatronics, 2010, pp. 275-279, Kuala Lumpur, Malaysia.
Buck James K, "About Canard Airplanes", Brighthub, 2010, p. 1, USA.
Song Yan-Ping, Yang Xiao-Guang, Li Ya-Chao, Chen Fu, "Numerical simulation of coanda effect in circulation control airfoil", Journal of Engineering Thermophysics, 2010, vol. 271, Harbin, China.
Guido A I Monterzino, Craig P Lawson, John P Fielding, "A methodology for low-cost, rapidimplementation solutions for airframe systems of UAV prototypes", 10th AIAA Aviation Technology, Integration, and Operations (ATIO) Conference, 2010, pp. 1-14, Texas, USA.
P F Zhang, B Yan, A B Liu, J J Wang, "Numerical Simulation on Plasma Circulation Control Airfoil", AIAA Journal, 2010, pp. 2213-2226, vol. 48, China.
Alan M Didion, Jonathan Kweder, Mary Ann Clarke, James E Smith, "Circulation control span-wise blowing location optimization for a helicopter rotor blade", ASME 2010 International Mechanical Engineering Congress and Exposition, 2010, pp. 123-126, USA.
Jonathan Kweder, Mary Ann Clarke, James E Smith, "Investigation into the Feasibility of an Augmented Propeller Design with the Use of a Passive Circulation Control System", ASME 2010 International Mechanical Engineering Congress and Exposition, 2010, pp. 127-135, vol. 1, British Columbia, Canada.
Jonathan Kweder, Mary Ann Clarke, James E Smith, "Elliptic airfoil stall analysis with trailing edge slots", ASME 2010 International Mechanical Engineering Congress and Exposition, 2010, pp. 145-151, vol. 1, British Columbia, Canada.
Caroline Lubert, "On Some Recent Applications of the Coanda Effect to Acoustics", 160th Meeting Acoustical Society of America Cancun, 2010, pp. 1-17, vol. 11, Cancun, Mexico.

(56) References Cited

OTHER PUBLICATIONS

Takafumi Nishino, Karim Shariff, "Large-eddy simulations of a turbulent Coanda jet on a circulation control airfoil", Physics of Fluids, 2010, pp. 1-56, vol. 22, Issue No. 12, California, USA.

Circiu, Ionica, Nedelcut Florin, Dinea Sorin, "Coanda effect used to improve the efficiency of a rotary wing aircraft", The annals of dunarea de jos, 2010, pp. 61-66, Brasov, Romania.

Dragan, Valeriu, "Numerical investigations of Coanda lift on a double curvature super circulated ramp", International Journal of Civil and Structural Engineering, 2011, pp. 241-248, vol. 2, Bucharest, Romania.

Guo B D, Liu P Q, Qu Q L, "Blowing Circulation Control on a Seaplane Airfoil", AIP conference proceedings, 2011, pp. 228-231, vol. 1376, China.

Hdjojodihardjo, Mfabdulhamid, S Basri, F I Romli, D L A Abdul Majid, "Numerical simulation and analysis of coanda effect circulation control for wind-turbine application considerations", IIUM Engineering Journal, Special Issue, Mechanical Engineering, 2011, pp. 19-42, vol. 12, Malaysia.

Errikos Levis, "Design Synthesis of Advanced Technology, Flying Wing Seaplanes", Imperial College London, 2011, pp. 1-222, USA.

Yang Wei, Yang Zhigang, "Schemed power-augmented flow for wing-in-ground effect craft in cruise", Chinese Journal of Aeronautics, 2011, pp. 119-126, vol. 24, Issue No. 2, China.

Fan Yong, Meng Xianyu, Yang Xili, Liu Kai, Zhu Jihong, "Control allocation for a V/Stol aircraft based on robust fuzzy control", Science china information sciences, 2011, pp. 1321-1326, vol. 54, Issue No. 6, Beijing, China.

B Saeed, G Gratton, "Exploring the aerodynamic characteristics of a blown annular wing for vertical/short take-off and landing applications", Proceedings of the institution of mechanical engineers, part g: journal of aerospace engineering, 2011, pp. 689-707, vol. 225, Issue No. 6, UK.

George Balan, Sorin-Gabriel Constantinescu, Bogdan Ciobanu, "The coanda vtol-UAV aeromechanical aspects", International conference of scientific paper afases, 2011, pp. 1205-1210, Romania.

B Saeed, G B Gratton, "An approach to evaluate lift generated by an annular-Coanda-wing for vertical/short take-off and landing applications", Proceedings of the institution of mechanical engineers, part g: journal of aerospace engineering, 2011, pp. 1298-1314, vol. 226, Issue No. 10, UK.

X Zhang, p. Chen, X Luo, "Airfoil flow control using plasma actuation and coanda effect", 29th AIAA Applied Aerodynamics Conference, 2011, pp. 1-14, Hawaii, USA.

A D Gardner, K Richter, H Rosemann, "Numerical investigation of air jets for dynamic stall control on the oa209 airfoil", CEAS Aeronautical Journal, 2011, pp. 1-10, Gottingen, Germany.

Tengfei Guo, Honglun Wang, Wendong Gai, "Transition flight control for Canard Rotor/Wing rotorcraft", Artificial Intelligence, Management Science and Electronic Commerce (AIMSEC), 2011, pp. 875-880, China.

Wendong Gai, Honglun Wang, Tengfei Guo, Dawei Li, "Modeling and LPV flight control of the Canard Rotor/ Wing unmanned aerial vehicle", Artificial Intelligence, Management Science and Electronic Commerce (AIMSEC), 2011, pp. 2187-2191, China.

Julian Tan Kok Ping, Chingseong Tan, Vincent Ong Teng Tat, "Coanda effect test bench (coetb)—design enhancement of the coandajlt craft", Sustainable Utilization and Development in Engineering and Technology, 2011, pp. 25-30, Malaysia.

Russo Enrico, Notarstefano Giuseppe, Hauser John, "Dynamics exploration and aggressive maneuvering of a Longitudinal Vectored Thrust VTOL aircraft", 2011 50th IEEE conference on decision and control and european control conference (CDC-ECC), 2011, pp. 8106-8111, Orlando, USA.

A Dumitrache, F Frunzulica and TC Ionescu, "Mathematical Modelling and Numerical Investigations on the Coanda Effect", Nonlinearity, Bifurcation and Chaos—Theory and Applications, 2012, pp. 101-132, USA.

Nikola Mirkov, Bosko Rasuo, "Maneuverability of an UAV with coanda effect based lift production", 28th International Congress of the Aeronautical Science, 2012, pp. 1-6, Belgrade, Serbia.

Mackenzie Carter, "Stol 'n' Lift", Canadian young scientist journal, 2012, pp. 31-35, Ontario, Canada.

H Djojodihardjo, M F Abdul Hamid, "Computational study on the influence of coanda jet on airfoils: two-dimensional case", 28th International Congress of the Aeronautical Sciences, 2012, pp. 1-13, Malaysia.

Valeriu Dragan, "Development of a coanda effect lift-thrust integrated system: celtis", International conference of scientific paper afases, 2012, pp. 1-5, Bucharest, Romania.

A V Petrov, "Aerodynamics of stol airplanes with powered high-lift systems", 28th international congress of the aeronautical sciences, 2012, pp. 1-9, Russia.

R J Huyssen, G R Spedding, E H Mathews, L Liebenberg, "Wing-Body Circulation Control by Means of a Fuselage Trailing Edge", Journal of aircraft, 2012, pp. 1279-1289, vol. 49, South Africa.

Hongjun Ran, Dimitri N Mavris, Michelle Kirby, "Rapid-Prototyping Method for Modeling a Circulation-Control Wing at Low Speeds", Journal of aircraft, 2012, pp. 1480-1484, vol. 49, Issue No. 5, Atlanta, USA.

Asha J Hall, Jaret C Riddick, "Micro-electro mechanical Flapping Wing Technology for Micro Air Vehicles", Proceedings vol. 8339, bioinspiration, biomimetics, and bioreplication, 2012, pp. 1-9, vol. 8339, USA.

Rizal E M Nasir, Zurriati Ali, "Investigation on Aerodynamic Characteristics of Baseline-II E-2 Blended Wing-Body Aircraft with Canard via Computational Simulation", AIP conference proceedings, 2012, pp. 700-706, vol. 1440, Issue No. 1, Malaysia.

Carsten Lenfers, "Propeller Design for a future QESTOL Aircraft in the BNF Project", 30th AIAA Applied Aerodynamics Conference, 2012, pp. 1-18, Braunschweig, Germany.

T Beutel, M Leester-Schadel, S Buttgenbach, "Design and evaluation process of a robust pressure sensor for measurements in boundary layers of liquid fluids", Microsystem Technologies, 2012, pp. 1-12, Braunschweig, Germany.

Nicolas Binder, Xavier Carbonneau, "Performance of a Thrust-Vectoring Solution for Unmanned Air Vehicles", Journal of propulsion and power, 2012, pp. 1125-1129, vol. 28, France.

Panfeng Zhang,Bo Yan, Chenfeng Dai, "Lift enhancement method by synthetic jet circulation control", Science china technological sciences, 2012, pp. 2585-2592, vol. 55, Issue No. 9, China.

Doig Graham, Barber Tracie J, Neely Andrew J, "Aerodynamic Characteristics of a Swept Wing in Close Ground Proximity at High Subsonic Mach Numbers", Journal of aerospace engineering, 2012, pp. 600-612, vol. 25, Issue No. 4, Sydney, Australia.

Antonio Dumas, Jose Pascoa, Michele Trancossi, Alessandro Tacchini, Galina Ilieva, Mauro Madonia, "Acheon project: a novel vectoring jet concept", Proceedings of the ASME 2012 International Mechanical Engineering Congress & Exposition, 2012, pp. 1-10, Texas, USA.

Brech Dale E, St Amand Joseph D, Hoover Randy C, McGough Jeff S, Bedillion Mark, "Design and Development of a Vector Thrusting Quadrotor for Minimally Induced Pitch and Roll Motions", International mechanical engineering congress and exposition, 2012, pp. 193-201, vol. 4, Texas, USA.

Christian Werner-Spatz, Wolfgang Heinze, Peter Horst, Rolf Radespiel, "Multidisciplinary conceptual design for aircraft with circulation control high-lift systems", CEAS Aeronautical Journal, 2012, pp. 145-164, vol. 3, Issue No. 2-4, Braunschweig, Germany.

Rory Martin Golden, "Design and Performance of Circulation Control Geometries", Master's Theses and Project Reports, 2013, pp. 1-192, San Luis Obispo, USA.

Bob Collins, "Engineering Investigation Report", The Coanda disk aircraft development program, 2013, pp. 1-23, UK.

Ovidiu Crivoi, Ioan Doroftei, Florentina Adascalitei, "A survey on unmanned aerial vehicles based on coanda effect", Tehnomus, 2013, pp. 338-344, Romania.

Patrick Clayton, "Development of high-lift laminar wing using steady active flow control", Aerospace Engineering Commons, 2013, pp. 1-64, Ames, Iowa.

(56) References Cited

OTHER PUBLICATIONS

Relly Victoria Petrescu, Florian Ion Petrescu, "The aviation history or new aircraft i color", Create Space USA, 2013, pp. 1-292, USA.
Pascual Marques, "Emerging Technologies in UAV Aerodynamics", International Journal of Unmanned Systems Engineering, 2013, pp. 3-4, vol. 1, Southport, UK.
Valeriu Dragan, "A new mathematical model for high thickness coanda effect wall jets", Review of the Air Force Academy, 2013, pp. 23-28, vol. 1, Issue No. 23, Romania.
Sommerwerk Kay,Haupt Matthias C, Horst Peter, "FSI of high performance high-lift devices with circulation control via conditioned coanda-jets", Computational methods for coupled problems in science and engineering, 2013, Germany.
Marco Burnazzi, Rolf Radespiel, "Design of a droopnose configuration for a coanda active flap application", 51st AIAA Aerospace Sciences Meeting including the New Horizons Forum and Aerospace Exposition, 2013, pp. 1-14, Braunschweig, Germany.
Vlad Ciobaca, Timo Kuhn, Ralf Rudnik, Matthias Bauer, Burkhard Golling, Wiebke Breitenstein, "Active Flow-Separation Control on a High-Lift Wing-Body Configuration", Journal of aircraft, 2013, pp. 56-72, vol. 50, Issue No. 1, Germany.
Laliberte Jeremy F, Kraemer Kurtis L, Dawson Jeff W, Miyata David, "Design and Manufacturing of Biologically Inspired Micro Aerial Vehicle Wings Using Rapid Prototyping", International journal of micro air vehicles, 2013, pp. 15-38, vol. 5, Issue No. 1, Ottawa, Canada.
Hamamoto Masaki, Ohta Yoshiji, Hara Keita, Hisada Toshiaki, "Free-flight analysis of dragonfly hovering by fluid-structure interaction analysis based on an arbitrary lagrangian-eulerian method", Advanced Robotics, 2013, pp. 657-666, Japan.
Kay Sommerwerk, Matthias Haupt, Peter Horst, "Aeroelastic performance assessment of a wing with coanda effect circulation control via fluid-structure interaction", 31st AIAA Applied Aerodynamics Conference, 2013, pp. 1-13, California, USA.
Hang Yin, Jihong Zhu, Xiaming Yuan, Chao Zhang, "Robust Hover Control of Thrust-vectored Unmanned Tail-sitter Aircraft Against Gust Load", 2013 10th IEEE international conference on control and automation (ICCA), 2013, pp. 735-738, China.
Wang Xiangyang, Zhu Jihong, Zhang Yijun, "Dynamics Modeling and Analysis of Thrust-Vectored V/STOL Aircraft", 2013 32nd chinese control conference (CCC), 2013, China.
Dos Santos Davi Antonio, Saotome Osamu, Cela Arben, "Trajectory Control of Multirotor Helicopters with Thrust Vector Constraints", 2013 21st mediterranean conference on control and automation (MED), 2013, pp. 375-379, Brazil.
A Abbas, J De Vicente, E Valero, "Aerodynamic technologies to improve aircraft performance", Aerospace science and technology, 2013, pp. 100-132, vol. 28, Issue No. 1, Spain.
Yuan Wei, Katupitiya Jay, "Dynamic Modelling and Control of a Vectored Thrust Aerial Vehicle", 2013 IEEE/asme international conference on advanced intelligent mechatronics (AIM), 2013, pp. 1361-1366, Australia.
A Savvaris, A Buonanno, A Tsourdos, "Design and Development of the DEMON UAV Fluidic Flight Control System", Guidance, Navigation, and Control and Co-located Conferences, 2013, pp. 1-10, Munich, Germany.
Jose C Pascoa, Antonio Dumas, Michele Trancossi, Paul Stewart, Dean Vucinic, "A review of thrust-vectoring in support of a v/stol non-moving mechanical propulsion system", Central European Journal of Engineering, 2013, pp. 374-388, vol. 3, Issue No. 3, Portugal.
Harijono Djojodihardjo, "Progress and development of coanda jet and vortex cell for aerodynamic surface circulation control—an overview", The SIJ Transactions on Advances in Space Research & Earth Exploration, 2013, pp. 32-42, vol. 1, Selangor, Malaysia.
S G Constantinescu, Mihai Niculescu, "Experimental and Numerical Research of Lift Force Produced by Coanda Effect", AIP conference proceedings, 2013, pp. 152-155, vol. 1558, Issue No. 1, Romania.
Witold Mielniczek, Stephen D Prior, Mehmet Ali Erbil, Mantas Brazinskas, "Investigating novel applications of the coanda effect for small morphing unmanned aircraft", 2013 Internatiomal Conference on Innovation, Communication, and Engineering, 2013, China.
Jeon Jaehyeok, Lee Hyoju, Han Seonhye, Lee Hyunyong, Lee Choonghan, Kim Yong Bum, Choi Hyouk Ryeol, "Design and Control of an Unmanned Aerial Vehicle (UAV) Based on the Coanda Effect", 2013 10th international conference on ubiquitous robots and ambient intelligence (URAI), 2013, pp. 129-129, Korea.
Farzad Banazadeh, Saeid Niazi, Afshin Banazadeh, "Computational investigation of fluidic counter flow thrust vectoring applied to small engine exhaust jet", 15th Conference on Fluid Dynamics, 2013, pp. 1-10, Iran.
Vom Fachbereich Maschinenbau, "Unmanned Aerial Vehicle for Flow Control Experiments with Dielectric Barrier Discharge Plasma Actuators"2014, pp. 1-183, Germany.
Nikola Mirkov, Bosko Rasuo, "Numerical simulation of air jet attachment to convex walls and application to uav", Boundary and Interior Layers, Computational and Asymptotic Methods, 2014, pp. 197-207, Belgrade, Serbia.
Shyam S Dasa, M Abdollahzadeha, Jose C Pascoaa, A Dumasb, M Trancoss, "Numerical modeling of coanda effect in a novel propulsive system", Int. Jnl. of Multiphysics, 2014, pp. 181-201, vol. 8, Covilha, Portugal.
Jared Carr, Rafael Ferraz, Songqi Gao, Aaron Jameson, Chang Yul Lee, Daniel Lu, Aaron Wienkers, Cheng Hao Yuan, "Investigation of the Effect of Tubercles on Airfoil Performance", University of California at Berkeley Spring 2014, 2014, pp. 1-19, Berkeley, California.
Ibraheem Alqadi, Mahmood Khalid, Salah Hafez, "Airfoil performance studies with a trailing edge jet flap", Canadian Aeronautics and Space Journal, 2014, pp. 23-35, vol. 60, Issue No. 2, Saudi Arabia.
Rolf Radespiel, Marco Burnazzi, "Fundamentals in coanda flap design", Active Flow and Combustion Control, 2014, pp. 1-15, USA.
Michael Sinapiusa, Hans Peter Monnera, Markus Kintschera, Johannes Riemenschneider, "Dlr's morphing wing activities within the european network", Procedia IUTAM, 2014, pp. 416-426, vol. 10, Braunschweig, Germany.
Rizal E M Nasir, Wahyu Kuntjoro,Wirachman Wisnoe, "Aerodynamic, Stability and Flying Quality Evaluation on a Small Blended Wing-body Aircraft with Canard Foreplanes", Procedia technology, 2014, pp. 783-791, vol. 15, Malaysia.
Baramee Wessapakdee, Pranchalee Makarasut, Chinnapat Thipyopas, "An Experimental and Computational Fluid Dynamic Study of Axis-Symmetric Coanda Configuration for VTOL MAV Application", Applied Mechanics and Materials, 2014, pp. 42-47, vol. 629, Switzerland.
Angel Huminic, Gabriela Huminic, "Automotive wing with active control of flow", University Politehnica Bucharest—Scientific Bulletin, Series D, 2014, pp. 231-238, vol. 76, Issue No. 4, Romania.
Carsten Lenfers, Ruud F Jansseny, Nils Beckz, Jens Friedrichs, Alireza Rezaeian, "Experimental Investigation of the Propeller Design for future QESTOL Aircraft in the BNF Project", AIAA SciTech Forum, 2014, pp. 1-13, USA.
Jonathan Kweder, Cale H Zeune, Jon Geiger, Andrew D Lowery, James E Smith, "Experimental Evaluation of an Internally Passively Pressurized Circulation Control Propeller", Journal of Aerodynamics, 2014, pp. 1-11, vol. 2014, USA.
K Sommerwer, M C Haupt, "Design analysis and sizing of a circulation controlled cfrp wing with coand-flaps via cfd-csm coupling", CEAS Aeronautical Journal, 2014, pp. 95-108, vol. 5, Issue No. 1, Braunschweig, Germany.
S V Vorob'ev, E V Myshenkov, E V Myshenkova, E Yu Shelgunov, "Rotation of the thrust vector of a two-dimensional nozzle by means of displacing the critical surface", Fluid Dynamics, 2014, pp. 288-297, vol. 49, Issue No. 2, Moscow, Russia.
Konstantinos Kanistras, Matthew J Rutherford, Kimon P Valavanis, "Development of a circulation control wing for uavs", Aerospace Conference, 2014, pp. 1-8, USA.

(56) References Cited

OTHER PUBLICATIONS

Sagar Bose, Rohan Verma, Kriti Garuda, Aditya Tripathi, Shibu Clement, "Modeling, analysis and fabrication of a thrust vectoring spherical VTOL aerial vehicle", 2014 IEEE aerospace conference, 2014, pp. 1-6, Goa, India.

Marco Burnazzi, Rolf Radespiel, "Design and analysis of a droop nose for coanda flap applications", Design and Analysis of a Droop Nose for Coanda Flap Applications, 2014, pp. 1567-1579, vol. 51, Issue No. 5, Brunswick, Germany.

Zhaohui Cen, Tim Smith, Paul Stewart, Jill Stewart, "Integrated flight/thrust vectoring control for jet-powered unmanned aerial vehicles with ACHEON propulsion", journal of aerospace engineering, 2014, pp. 1057-1075, vol. 229, Issue No. 6, UK.

Adeel Khalid, Parth Kumar, "Aerodynamic Optimization of Box Wing—A Case Study", International Journal of Aviation, Aeronautics, and Aerospace, 2014, pp. 1-45, vol. 1, Issue No. 4, USA.

Aditi Kajale, Neha Joshi, Shraddha Borase, Manisha Mhetre, "Coanda effect flow meter", 2nd International Conference on Emerging Trends in Engineering & Techno-Sciences, 2014, pp. 44-49, India.

Marco Petrolo, Erasmo Carrera, Michele D'Ottavio, Coen De Visser, Zdenek Patek, Zdenek Janda 6E, "On the development of the Anuloid, a disk-shaped VTOL aircraft for urban areas", Advances in Aircraft and Spacecraft Science, 2014, pp. 353-378, vol. 1, Issue No. 3, Australia.

Galina Ilieva, Jose Pascoa, Antonio Dumas, Michele Trancossi, "Maat—promising innovative design and green propulsive concept for future airship's transport", Aerospace science and technology, 2014, pp. 1-14, vol. 35, Italy.

K C Pfingsten, R D Cecora, R Radespiel, "An experimental investigation of a gapless high-lift system using circulation control", Katenet II Conference, 2014, pp. 1-17, Germany.

Aditi Kajale, Neha Joshi, Shraddha Borase, Manisha Mhetre, "Micrcontroller based coanda effect flow meter", International Journal of Advances in Applied Science and Engineering, 2014, pp. 125-130, vol. 1, Issue No. 3, Pune, India.

Rinie A Akkermans, Michael Pott-Pollenske, Heino Buchholz, Jan Delfs, Daniela Almoneit, "Installation Effects of a Propeller Mounted on a High-Lift Wing with a Coanda Flap. Part I: Aeroacoustic Experiments", AIAA AVIATION Forum, 2014, pp. 1-14, Braunschweig, Germany.

Pradeep Kumar, Yosef M El Sayed, Richard Semaan, "Optimized sensor placement using stochastic estimation for a flow over a 2d airfoil with coanda blowing", 7th AIAA Flow Control Conference, 2014, pp. 1-11, Braunschweig, Germany.

Juergen Dierke, Rinie A Akkermans, Jan Delfs, "Installation effects of a propeller mounted on a wing with coanda flap. part ii: numerical investigation and experimental validation", 20th AIAA/CEAS Aeroacoustics Conference, 2014, pp. 1-23, Braunschweig, Germany.

Gai Wendong, Zhang Jing, Huang Liangsong, Li Yuxia, "Transition Flight Control Using Adaptive Neutral Network Dynamic inversion for Canard Rotor/Wing UAV", 26th chinese control and decision conference (2014 CCDC), 2014, pp. 4210-4214, Qingdao, China.

Han Seonhye, Lee Hyunyong, Lee Hyoju, Jeon Jaehyeok, Lee Choonghan, Kim Yong Bum, Choi Hyouk Ryeol, "A Flying Saucer Lifted with Coanda Effect", 2014 IEEE international conference on robotics and automation (ICRA), 2014, p. 2561, Hong Kong, China.

Papachristos Christos, Alexis Kostas, Tzes Anthony, "Efficient Force Exertion for Aerial Robotic Manipulation: Exploiting the Thrust-Vectoring Authority of a Tri-TiltRotor UAV", 2014 IEEE international conference on robotics and automation (ICRA), 2014, pp. 4500-4505, China.

A Sunol, D Vucinic, "Numerical analysis and UAV application of the ACHEON thrust vectoring nozzle", AIAA Aviation, 2014, pp. 1-12, Atlanta, USA.

Konstantinos Kanistras, Matthew J Rutherford, Nikolaos Vitzilaios, "Experimental Study of Circulation Control Wings at Low Reynolds Numbers", 32nd AIAA Applied Aerodynamics Conference, 2014, pp. 1-17, USA.

Aleks Udris, "What Are Canards, and Why Don't More Aircraft Have Them?", Boldmethod Llc, 2014, pp. 1-11, USA.

Ahmed Riyadh Ibraheem, Djojodihardjo Harijono, Abu Talib Abd Rahim, Mohd Rafie, Azmin Shakrine, "Application of Coanda Jet for Generating Lift of Micro Air Vehicles—Preliminary Design Considerations", Mechanics and Materials, 2014, pp. 139-144, vol. 629, Switzerland.

Martin Schwerter, Monika Leester-Schadel, Stephanus Buttgenbach, Andreas Dietzel, Christian Behr, Michael Sinapius, Peter Wierach, "Mems pressure sensors embedded into fiber composite airfoils", Sensors, 2014, pp. 531-534, Braunschweig, Germany.

Harijono Djojodihardjo, Riyadh Ibraheem Ahmed, Ali Yousefian, "An analysis on the lift generation for coanda micro air vehicles", Aerospace Electronics and Remote Sensing Technology, 2014, pp. 164-169, Malaysia.

Jose C Pascoa, Frederico F Rodrigues, Shyam S Das, M Abdollahzadeh, A Dumas, Michele Trancossi, Maharshi Subhash, "Exit flow vector control on a coanda nozzle using dielectric barrier discharge actuator", Proceedings of the ASME 2014 International Mechanical Engineering Congress and Exposition, 2014, pp. 1-8, Portugal.

J Delfs, B Fabmann, N Lippitz, M Lummer, M Mobner, L Muller, K Rurkowska, S Uphoff, "SFB 880: aeroacoustic research for low noise take-off and landing", CEAS Aeronautical Journal, 2014, pp. 403-417, Braunschweig, Germany.

M Burnazzi, R Radespiel, "Assessment of leading-edge devices for stall delay on an airfoil with active circulation control", CEAS Aeronautical Journal, 2014, pp. 359-385, vol. 5, Issue No. 4, Germany.

Nedelcut Florin, "Aspects regarding concept, design, development and use of a coanda effect unmanned aerial vehicle", The annals of dunarea de jos, 2014, pp. 35-40, Romania.

Rasuo, Bosko, Mirkov Nikola, "On the possibility of using coanda effect for unmanned aerial vehicles—a numerical investigation", PAMM: Proceedings in Applied Mathematics & Mechanics, 2014, pp. 627-628, Belgrade, Serbia.

Gongjun Li, Bin Meng, "Actuators Coupled Design Based Adaptive Backstepping Control of Air-breathing Hypersonic Vehicle", IFAC-PapersOnLine, 2015, pp. 508-513, vol. 48, Issue No. 28, China.

M Forster, M Biava, R Steijl, "Optimisation of Coanda Surfaces for Transonic Circulation Control", 6th European Conference for Aerospace Sciences, 2015, pp. 1-14, UK.

Harijono Djojodihardjo, Riyadh I Ahmed, A R Abu-Talib, A S Mohd-Rafie, "Analyical and CFD visualization studies of coanda MAV", 13th Asian Symposium on Visualization, 2015, pp. 1-10, vol. 13, Novosibirsk, Russia.

Enamul Haque, Shafayate Hossain, Assad-Uz-Zaman, Mohammad Mashud, "Design and construction of an unmanned aerial vehicle based on coanda effect", Proceedings of the International Conference on Mechanical Engineering and Renewable Energy, 2015, pp. 1-6, Khulna, Bangladesh.

Dennis Keller, Ralf Rudnik, "Numerical Investigation of Engine Effects on a Transport Aircraft with Circulation Control", Journal of aircraft, 2015, pp. 421-438, vol. 52, Issue No. 2, Braunschweig, Germany.

Yosef El Sayed Mohamed, Richard Semaan, "Progress toward closed loop control of a flow around an airfoil with coanda blowing", Instability and Control of Massively Separated Flows, 2015, pp. 71-76, Braunschweig, Germany.

Yifei Zhang, Lijun Xu, Haixin Chen, "Numerical Research on Aerodynamic Efficiency of GFS UAV", AIAA SciTech Forum, 2015, pp. 1-13, Florida, USA.

Alexis Lefebvre, G C Zha, Coral Gables, "Design of High Wing Loading Compact Electric Airplane Utilizing Co-Flow Jet Flow Control", 53rd AIAA Aerospace Sciences Meeting, 2015, pp. 1-23, Florida, USA.

M Abdollahzadeh, F Rodrigues, J C Pascoa, P J Oliveira, "Numerical design and analysis of a multi-dbd actuator configuration for the experimental testing of acheon nozzle model", Aerospace science and technology, 2015, pp. 259-273, vol. 41, Covilha, Portugal.

S H Teichel, M Dorbaum, O Misir, A Merkert, A Mertens, J R Seume, B Ponick, "Design considerations for the components of

(56) References Cited

OTHER PUBLICATIONS electrically powered active high-lift systems in civil aircraft", CEAS Aeronautical Journal, 2015, pp. 49-67, vol. 6, Issue No. 1, Hannover, Germany.

Jobst Henning Diekmann, "Analysis of trimmable conditions for a civil aircraft with active high-lift system", CEAS Aeronautical Journal, 2015, pp. 109-120, vol. 6, Issue No. 1, Germany.

Konstantinos Kanistras, Pranith Chander Saka, Kimon P Valavanis, "Design and development of an air supply unit for circulation control wing-based uavs", Aerospace Conference, 2015, pp. 1-10, USA.

Drew James, Perry Dominic, Stevenson Beth, Trimble Stephen, "Coanda effect makes flying saucer", Flight International, 2015, p. 25, vol. 187, Issue No. 5488, USA.

Milosz J Kalinowski, "Structural Optimization of Box Wing Aircraft", Archive of mechanical engineering, 2015, pp. 45-60, vol. 62, Warsaw, Poland.

Jobst Henning Diekmann, Klaus-Uwe Hahn, "Effect of an active high-lift system failure during landing approaches", CEAS Aeronautical Journal, 2015, pp. 181-196, vol. 6, Issue No. 2, Braunschweig, Germany.

M Burnazzi, R Radespiel, "Synergies between suction and blowing for active high-lift flaps", CEAS Aeronautical Journal, 2015, pp. 305-318, vol. 6, Issue No. 2, Braunschweig, Germany.

Kuang Minchi, Zhu Jihong, "Hover control of a thrust-vectoring aircraft", Science china information sciences, 2015, pp. 1-5, vol. 58, Issue No. 7, Beijing, China.

Konstantinos Kanistras, Pranith Chander Saka, Kimon P Valavanis, Nikolaos I Vitzilaios, Matthew J Rutherford, "Low Speed Wind Tunnel Investigation of a Circulation Control Wing for Enhanced Lift", 33rd AIAA Applied Aerodynamics Conference, 2015, pp. 1-17, Denver, US.

Gan Caiyin, Sahari Khairul, Tan Chingseong, "Numerical investigation on Coanda flow over a logarithmic surface", Journal of Mechanical Science & Technology, 2015, pp. 2863-2869, vol. 29, Issue No. 7, Kajang, Malaysia.

Hiranya Jayakody, Jay Katupitiya, "An Adaptive Variable Structure Control Methodology for Attitude and Position Control of a Vectored Thrust Aerial Vehicle", 2015 IEEE international conference on advanced intelligent mechatronics (AIM), 2015, pp. 1014-1019, Busan, Korea.

Martin Krosche, Wolfgang Heinze, "Robustness Analysis of an Aircraft Design for Short Takeoff and Landing", Journal of aircraft, 2015, pp. 1235-1246, vol. 52, Issue No. 4, Braunschweig, Germany.

\* cited by examiner

EJECTOR AND AIRFOIL CONFIGURATIONS

PRIORITY CLAIM

This application claims priority to U.S. Provisional Application No. 62/213,465, filed Sep. 2, 2015, the entire disclosure of which is hereby incorporated by reference as if fully set forth herein.

COPYRIGHT NOTICE

This disclosure is protected under United States and International Copyright Laws. © 2016 Jetoptera. All rights reserved. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND

Aircrafts that can hover, take off and land vertically are commonly referred to as Vertical Take-Off and Landing (VTOL) aircrafts. This classification includes fixed-wing aircrafts as well as helicopters and aircraft with tilt-able powered rotors. Some VTOL aircrafts can operate in other modes as well, such as Short Take-Off and Landing (STOL). VTOL is a subset of V/STOL (Vertical and/or Short Take-off and Landing).

For illustrative purposes, an example of a current aircraft that has VTOL capability is the F-35 Lightning. Conventional methods of vectoring the vertical lift airflow includes the use of nozzles that can be swiveled in a single direction along with the use of two sets of flat flapper vanes arranged 90 degrees to each other and located at the external nozzle. The propulsion system of the F-35 Lightning, similarly, provides vertical lifting force using a combination of vectored thrust from the turbine engine and a vertically oriented lift fan. The lift fan is located behind the cockpit in a bay with upper and lower clamshell doors. The engine exhausts through a three-bearing swivel nozzle that can deflect the thrust from horizontal to just forward of vertical. Roll control ducts extend out in each wing and are supplied with their thrust with air from the engine fan. Pitch control is affected via lift fan/engine thrust split. Yaw control is through yaw motion of the engine swivel nozzle. Roll control is provided by differentially opening and closing the apertures at the ends of the two roll control ducts. The lift fan has a telescoping "D"-shaped nozzle to provide thrust deflection in the forward and aft directions. The D-nozzle has fixed vanes at the exit aperture.

The design of an aircraft or drone more generally consists of its propulsive elements and the airframe into which those elements are integrated. Conventionally, the propulsive device in aircrafts can be a turbojet, turbofan, turboprop or turboshaft, piston engine, or an electric motor equipped with a propeller. The propulsive system (propulsor) in small unmanned aerial vehicles (UAVs) is conventionally a piston engine or an electric motor which provides power via a shaft to one or several propellers. The propulsor for a larger aircraft, whether manned or unmanned, is traditionally a jet engine or a turboprop. The propulsor is generally attached to the fuselage or the body or the wings of the aircraft via pylons or struts capable of transmitting the force to the aircraft and sustaining the loads. The emerging mixed jet (jet efflux) of air and gases is what propels the aircraft in the opposite direction to the flow of the jet efflux.

Conventionally, the air stream efflux of a large propeller is not used for lift purposes in level flight and a significant amount of kinetic energy is hence not utilized to the benefit of the aircraft, unless it is swiveled as in some of the applications existing today (namely the Bell Boeing V-22 Osprey). Rather, the lift on most existing aircrafts is created by the wings and tail. Moreover, even in those particular VTOL applications (e.g., take-off through the transition to level flight) found in the Osprey, the lift caused by the propeller itself is minimal during level flight, and most of the lift force is nonetheless from the wings.

The current state of art for creating lift on an aircraft is to generate a high-speed airflow over the wing and wing elements, which are generally airfoils. Airfoils are characterized by a chord line extended mainly in the axial direction, from a leading edge to a trailing edge of the airfoil. Based on the angle of attack formed between the incident airflow and the chord line, and according to the principles of airfoil lift generation, lower pressure air is flowing over the suction (upper) side and conversely, by Bernoulli law, moving at higher speeds than the lower side (pressure side). The lower the airspeed of the aircraft, the lower the lift force, and higher surface area of the wing or higher angles of incidence are required, including for take-off.

Large UAVs make no exception to this rule. Lift is generated by designing a wing airfoil with the appropriate angle of attack, chord, wingspan, and camber line. Flaps, slots and many other devices are other conventional tools used to maximize the lift via an increase of lift coefficient and surface area of the wing, but it will be generating the lift corresponding to at the air-speed of the aircraft. (Increasing the area (S) and lift coefficient ($C_L$) allow a similar amount of lift to be generated at a lower aircraft airspeed (V0) according to the formula $L=\frac{1}{2} \rho V^2 S C_L$, but at the cost of higher drag and weight.) These current techniques also perform poorly with a significant drop in efficiency under conditions with high cross winds.

While smaller UAVs arguably use the thrust generated by propellers to lift the vehicle, the current technology strictly relies on control of the electric motor speeds, and the smaller UAV may or may not have the capability to swivel the motors to generate thrust and lift, or transition to a level flight by tilting the propellers. Furthermore, the smaller UAVs using these propulsion elements suffer from inefficiencies related to batteries, power density, and large propellers, which may be efficient in hovering but inefficient in level flight and create difficulties and danger when operating due to the fast moving tip of the blades. Most current quadcopters and other electrically powered aerial vehicles are only capable of very short periods of flight and cannot efficiently lift or carry large payloads, as the weight of the electric motor system and battery may already be well exceeding 70% of the weight of the vehicle at all times of the flight. A similar vehicle using jet fuel or any other hydrocarbon fuel typically used in transportation will carry more usable fuel by at least one order of magnitude. This can be explained by the much higher energy density of the hydrocarbon fuel compared to battery systems (by at least one order of magnitude), as well as the lower weight to total vehicle weight ratio of a hydrocarbon fuel based system.

Accordingly, there is a need for enhanced efficiency, improved capabilities, and other technological advancements in aircrafts, particularly to UAVs and certain manned aerial vehicles.

BRIEF DESCRIPTION OF THE DRAWING FIGURES

DETAILED DESCRIPTION

This application is intended to describe one or more embodiments of the present invention. It is to be understood that the use of absolute terms, such as "must," "will," and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms. In addition, the headings in this application are for reference purposes only and shall not in any way affect the meaning or interpretation of the present invention.

One embodiment of the present invention includes a propulsor that utilizes fluidics for the entrainment and acceleration of ambient air and delivers a high speed jet efflux of a mixture of the high pressure gas (supplied to the propulsor from a gas generator) and entrained ambient air. In essence, this objective is achieved by discharging the gas adjacent to a convex surface. The convex surface is a so-called Coanda surface benefiting from the Coanda effect described in U.S. Pat. No. 2,052,869 issued to Henri Coanda on Sep. 1, 1936. In principle, the Coanda effect is the tendency of a jet-emitted gas or liquid to travel close to a wall contour even if the direction of curvature of the wall is away from the axis of the jet. The convex Coanda surfaces discussed herein with respect to one or more embodiments does not have to consist of any particular material.

Figure 1:
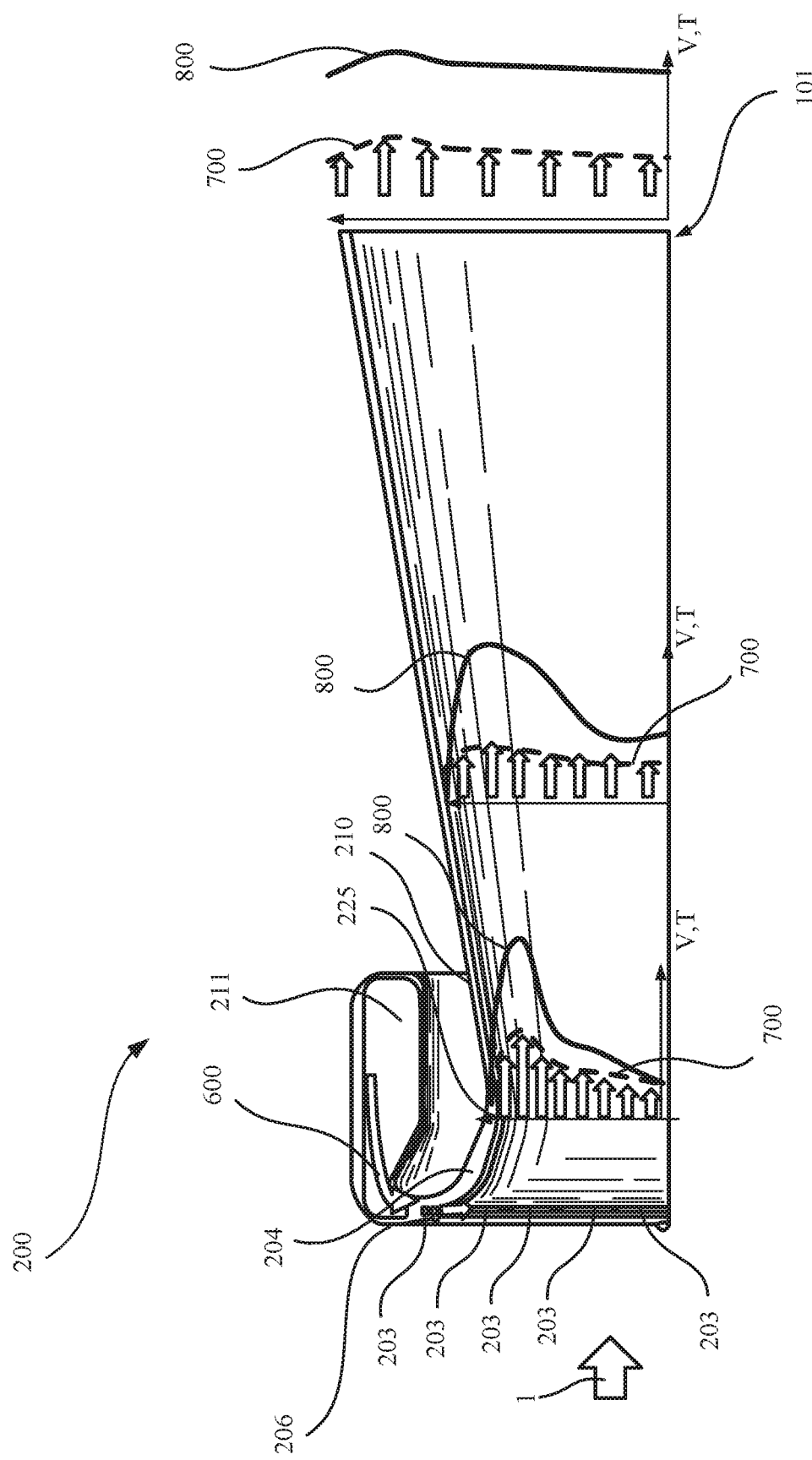
FIG. 1 is a cross-section of one embodiment of the present invention depicting the upper half of an ejector and profiles of velocity and temperature within the internal flow.

FIG. 1 illustrates a cross-section of the upper half of an ejector 200 that may be attached to a vehicle (not shown), such as, for non-limiting example, a UAV or a manned aerial vehicle such as an airplane. A plenum 211 is supplied with hotter-than-ambient air (i.e., a pressurized motive gas stream) from, for example, a combustion-based engine that may be employed by the vehicle. This pressurized motive gas stream, denoted by arrow 600, is introduced via at least one conduit, such as primary nozzles 203, to the interior of the ejector 200. More specifically, the primary nozzles 203 are configured to accelerate the motive fluid stream 600 to a variable predetermined desired velocity directly over a convex Coanda surface 204 as a wall jet. Additionally, primary nozzles 203 provide adjustable volumes of fluid stream 600. This wall jet, in turn, serves to entrain through an intake structure 206 secondary fluid, such as ambient air denoted by arrow 1, that may be at rest or approaching the ejector 200 at non-zero speed from the direction indicated by arrow 1. In various embodiments, the nozzles 203 may be arranged in an array and in a curved orientation, a spiraled orientation, and/or a zigzagged orientation.

The mix of the stream 600 and the air 1 may be moving purely axially at a throat section 225 of the ejector 200. Through diffusion in a diffusing structure, such as diffuser 210, the mixing and smoothing out process continues so the profiles of temperature (800) and velocity (700) in the axial direction of ejector 200 no longer have the high and low values present at the throat section 225, but become more uniform at the terminal end 101 of diffuser 210. As the mixture of the stream 600 and the air 1 approaches the exit plane of terminal end 101, the temperature and velocity profiles are almost uniform. In particular, the temperature of the mixture is low enough to be directed towards an airfoil such as a wing or control surface.

Figure 2:
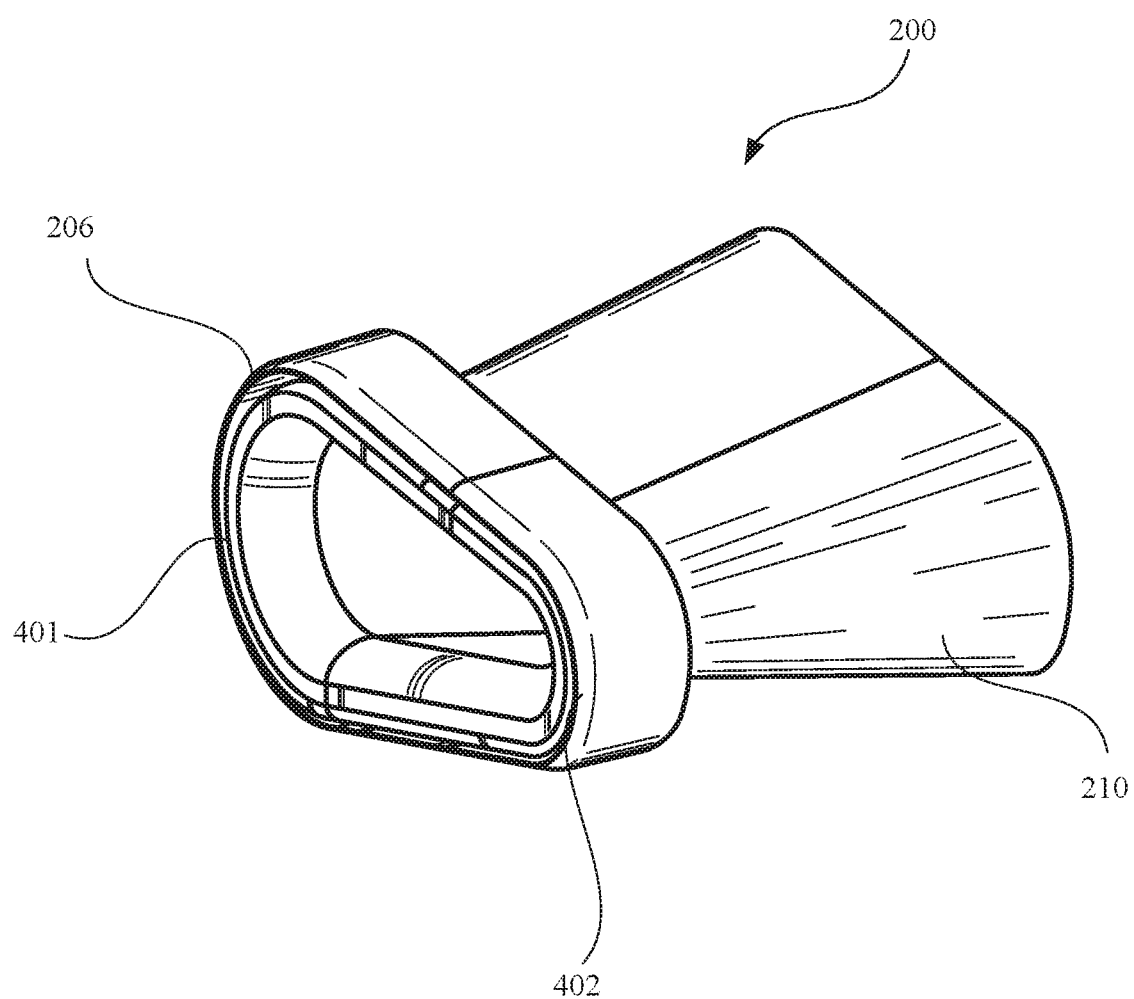
FIG. 2 illustrates a partial perspective view of an intake structure according to an embodiment.

In an embodiment, intake structure 206 and/or terminal end 101 may be circular in configuration. However, in varying embodiments, and as best shown in FIG. 2, intake structure 206, as well as terminal end 101, can be non-circular and, indeed, asymmetrical (i.e., not identical on both sides of at least one, or alternatively any-given, plane bisecting the intake structure). For example, as shown in FIG. 2, the intake structure 206 can include first and second lateral opposing edges 401, 402, wherein the first lateral opposing edge has a greater radius of curvature than the second lateral opposing edge. Terminal end 101 may be similarly configured.

Figure 3:
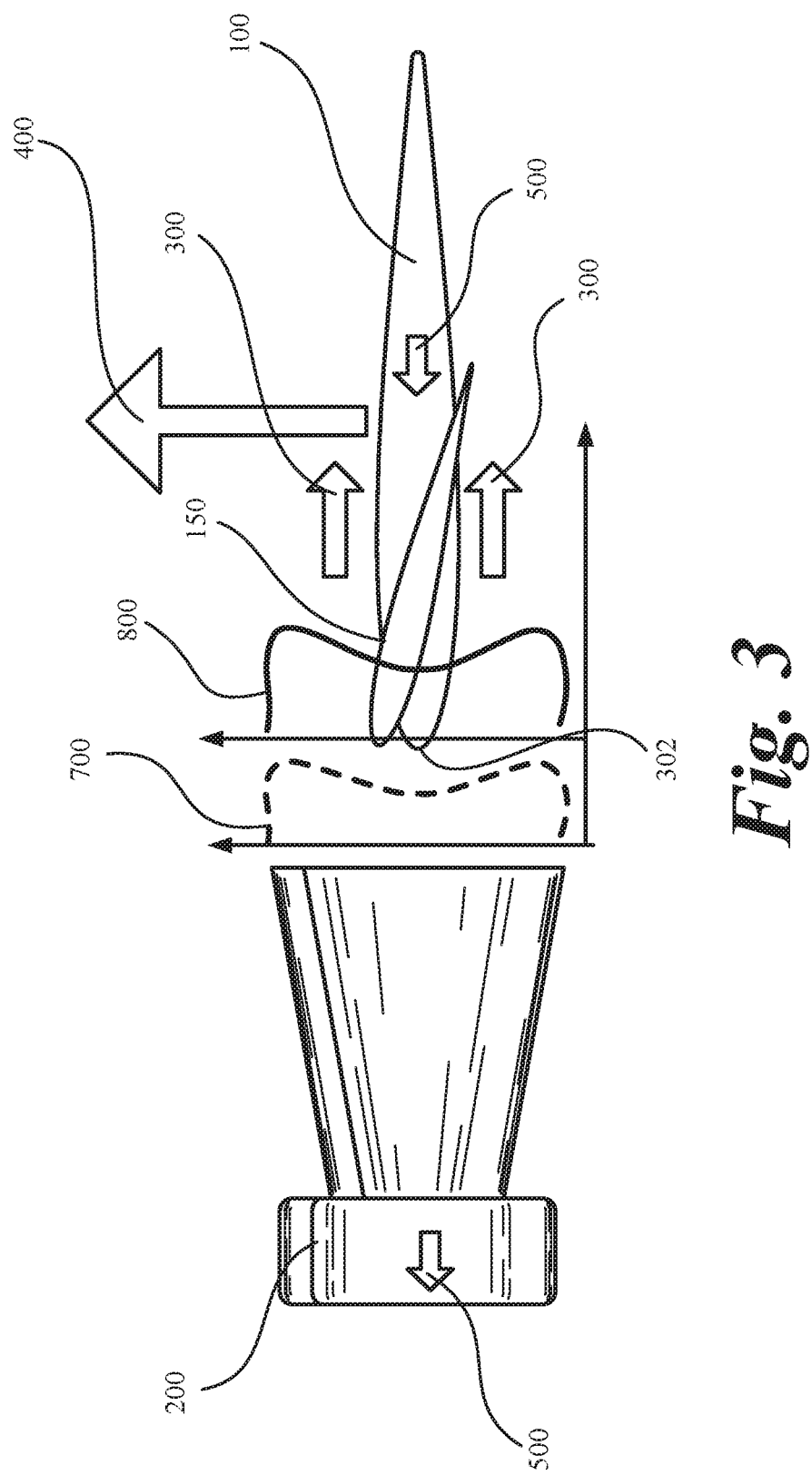
FIG. 3 illustrates a side plan view of an ejector placed in front of a control surface according to an embodiment.

FIG. 3 illustrates the propulsor/ejector 200, placed in front of a control surface, such as an airfoil 100 having a leading edge 302 and generating a lift force 400. As is illustrated, airfoil 100 is positioned directly behind (i.e., downstream) of outlet structure, such as terminal end 101 of diffuser 210, of ejector such that propulsive fluid from the ejector 200 flows over the airfoil. Indeed, in an embodiment, airfoil 100 may be positioned close enough to terminal end 101 such that only propulsive fluid from the ejector 200, exclusive of other ambient air, flows over airfoil. As used herein, the term "directly behind" may be construed to mean that at least a portion of leading edge 302 is within, or aligned with one of, the planes (a) occupied by surfaces of terminal end 101 that are parallel with the leading edge and (b) extending in the direction axial to ejector 200 (i.e., in the direction of arrows 300 discussed below).

The local flow over airfoil 100 is at higher speed than the speed of the aircraft, due to higher velocity of ejector 200 exit jet efflux, denoted by arrows 300, in comparison with aircraft airspeed denoted by arrow 500. The ejector 200 mixes vigorously the hotter motive stream 600 (FIG. 1) with the incoming cold ambient stream of air at high entrainment rate. Additional control surfaces can be implemented on the airfoil 100, such as elevator surface 150. In an embodiment the entirety of any such control surface is rotatable about an axis oriented parallel to the leading edge 302. By changing the angle of such surfaces 100 and/or 150, the attitude of the aircraft can rapidly be changed with little effort given the higher local velocity of the jet efflux 300. The mixture is homogeneous enough to reduce the hot motive stream 600 of the ejector temperature to a mixture temperature profile 800 that will not negatively impact the airfoils 100 or 150 mechanically or structurally. The velocity profile 700 of the efflux jet leaving the propulsor is such that it will allow more lift 400 to be generated by airfoil 100 due to higher local speeds.

Figure 4:
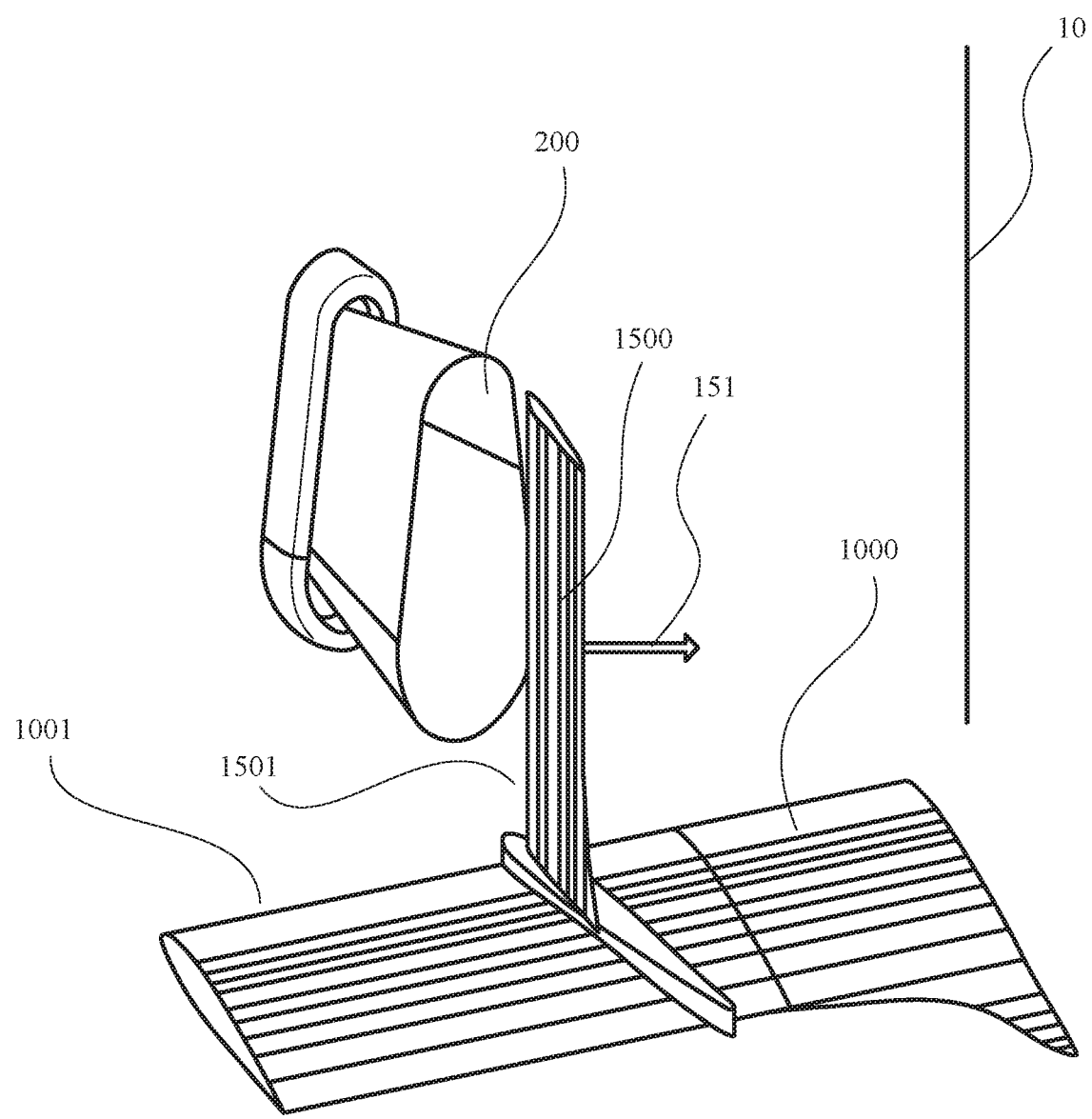
FIG. 4 is a perspective view of an ejector placed in front of a control surface in combination with another control surface according to an embodiment.

FIG. 4 illustrates that the propulsor/ejector 200 may also be placed in front of a control surface 1500 in combination with another airfoil 1000 and in a configuration different from that of control surfaces illustrated in FIG. 3. In the illustrated embodiment, leading edge 1501 of control surface 1500 is disposed at an approximately 90-degree angle with respect to leading edge 1001 of airfoil 1000. The ejector 200 may be a non-axisymmetric shape, and the control surface may be placed exactly in the wake of said ejector 200. The ejector 200 mixes vigorously the hotter motive stream 600 (FIG. 1) with the incoming cold ambient stream of air at high entrainment rate. Similarly, the mixture is homogeneous enough to reduce the hot motive stream 600 of the ejector temperature to a mixture temperature profile that will not negatively impact the control surface 1500 mechanically or structurally. In this embodiment, yaw can be controlled by changing the orientation of control surface 1500. In similar fashions, and by varying the orientation of a control surface 1500 with respect to a vehicle main body, such as an aircraft fuselage, pitch and roll may likewise be controlled. A function of ejector 200 is to generate thrust, but it can also provide lift or attitude control. In this embodiment, yaw control is in direction 151 creating a rotation around the aircraft axis 10.

Figure 5:
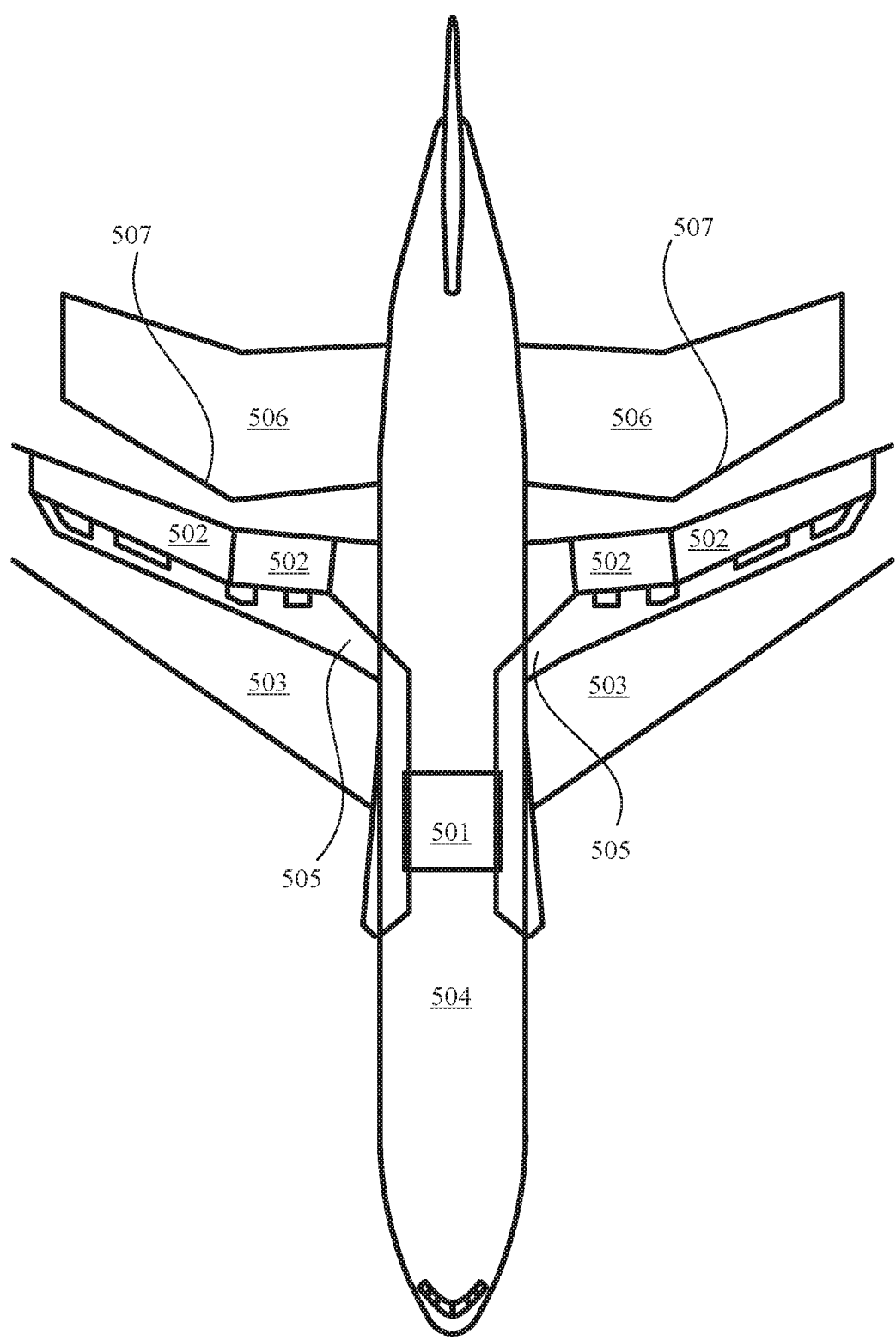
FIG. 5 is a top partial cross-sectional view of an alternative embodiment.

FIG. 5 illustrates an embodiment that provides an alternative to the traditional approach of placing jet engines on the wings of an aircraft to produce thrust. In FIG. 5, a gas generator 501 produces a stream of motive air for powering a series of ejectors 502 that are embedded in the primary airfoils, such as wings 503, for forward propulsion by emitting the gas stream directly from the trailing edge of the primary airfoils. In this embodiment, the gas generator 501 is embedded into the main-body fuselage 504 of the aircraft, is fluidly coupled to the ejectors 502 via conduits 505 and is the sole means of propulsion of the aircraft. Ejectors 502 may be circular or non-circular such as is the embodiment illustrated in FIG. 2, have correspondingly shaped outlet structure similar to terminal end 101 and provide, at a predetermined adjustable velocity, the gas stream from generator 501 and conduits 505. Additionally, ejectors 502 may be movable in a manner similar to that of flaps or ailerons, rotatable through a 180° angle and can be actuated to control the attitude of the aircraft in addition to providing the required thrust. Secondary airfoils 506 having leading edges 507 are placed in tandem with wings 503 and directly behind ejectors 502 such that the gas stream from the ejectors 502 flows over the secondary airfoils 506. The secondary airfoils 506 hence receive a much higher velocity than the airspeed of the aircraft, and as such creates a high lift force, as the latter is proportional to the airspeed squared. The entirety of the secondary airfoils 506 may be rotatable about an axis oriented parallel to the leading edges 507.

In this embodiment of the present invention, the secondary airfoil 506 will see a moderately higher temperature due to mixing of the motive fluid produced by the gas generator 501 (also referred to as the primary fluid) and the secondary fluid, which is ambient air, entrained by the motive fluid at a rate between 5-25 parts of secondary fluid per each primary fluid part. As such, the temperature that the secondary airfoil 506 sees is a little higher than the ambient temperature, but significantly lower than the motive fluid, allowing for the materials of the secondary wing to support and sustain the lift loads, according to the formula: $T_{mix} = (T_{motive} + ER \cdot T_{amb})/(1+ER)$ where $T_{max}$ is the final fluid mixture temperature of the jet efflux emerging from the ejector 502, ER is the entrainment rate of parts of ambient air entrained per part of motive air, $T_{motive}$ is the hotter temperature of the motive or primary fluid, and $T_{amb}$ is the approaching ambient air temperature.

Figure 6:
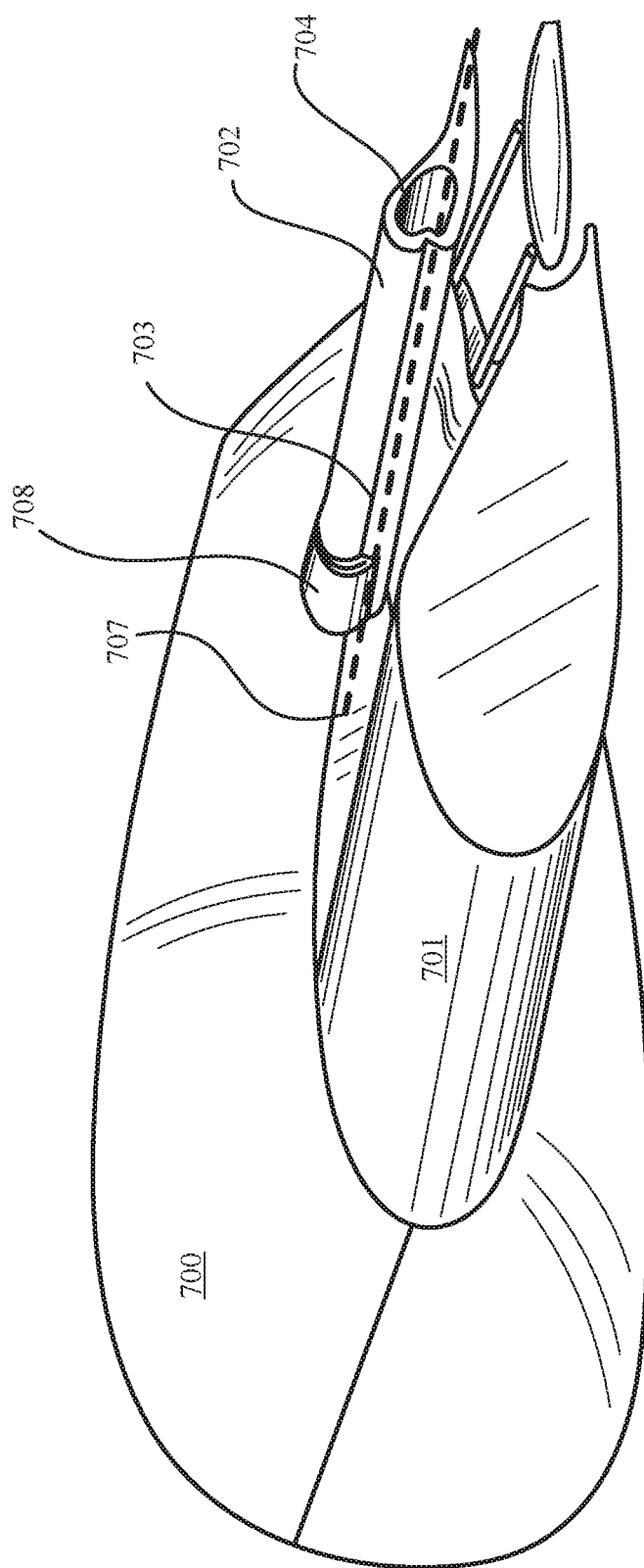
FIG. 6 is a side perspective view of an alternative embodiment.
Figure 7:
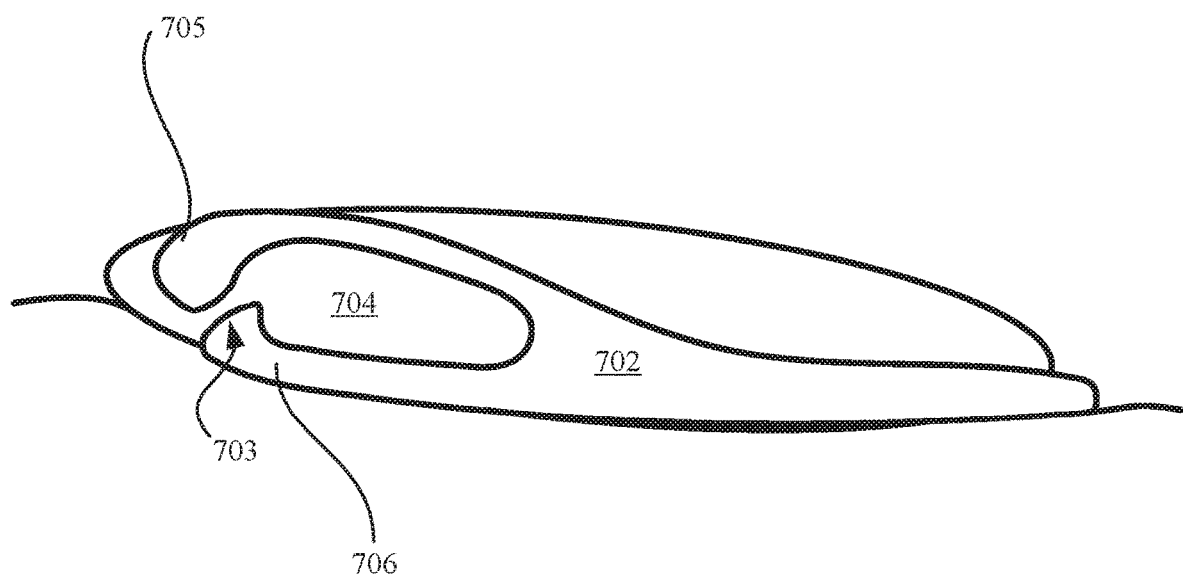
FIG. 7 is a side view of element of the embodiment illustrated in FIG. 6.

FIG. 6 illustrates a propulsion system for a vehicle 700 according to an alternative embodiment. A first augmenting airfoil 702 is coupled to the vehicle 700 and positioned downstream of fluid flowing over a primary airfoil 701 of the vehicle. Airfoil 702 is configured to rotate about axis 707 and controlled by an actuator 708. As best illustrated in FIG. 7, the first augmenting airfoil 702 includes a first output structure, such as opposing nozzle surfaces 705, 706 and at least one conduit, such as plenum 704, in fluid communication with a terminal end 703 defined by the nozzle surfaces. Nozzle surfaces 705, 706 may or may not include nozzles similar to nozzles 203 discussed above with reference to FIG. 1. Additionally, one or more of nozzle surfaces 705, 706 may include a convex surface that can, consequently, promote the Coanda effect and may have continuously rounded surfaces with no sharp or abrupt corners. Plenum 704 is supplied with hotter-than-ambient air (i.e., a pressurized motive gas stream) from, for example, a combustion-based engine that may be employed by the vehicle 700. Plenum 704 is configured to introduce this gas stream to the terminal end 703, which is configured to provide egress for the gas stream toward the primary airfoil 701 and out of the first augmenting airfoil 702.

Figure 8:
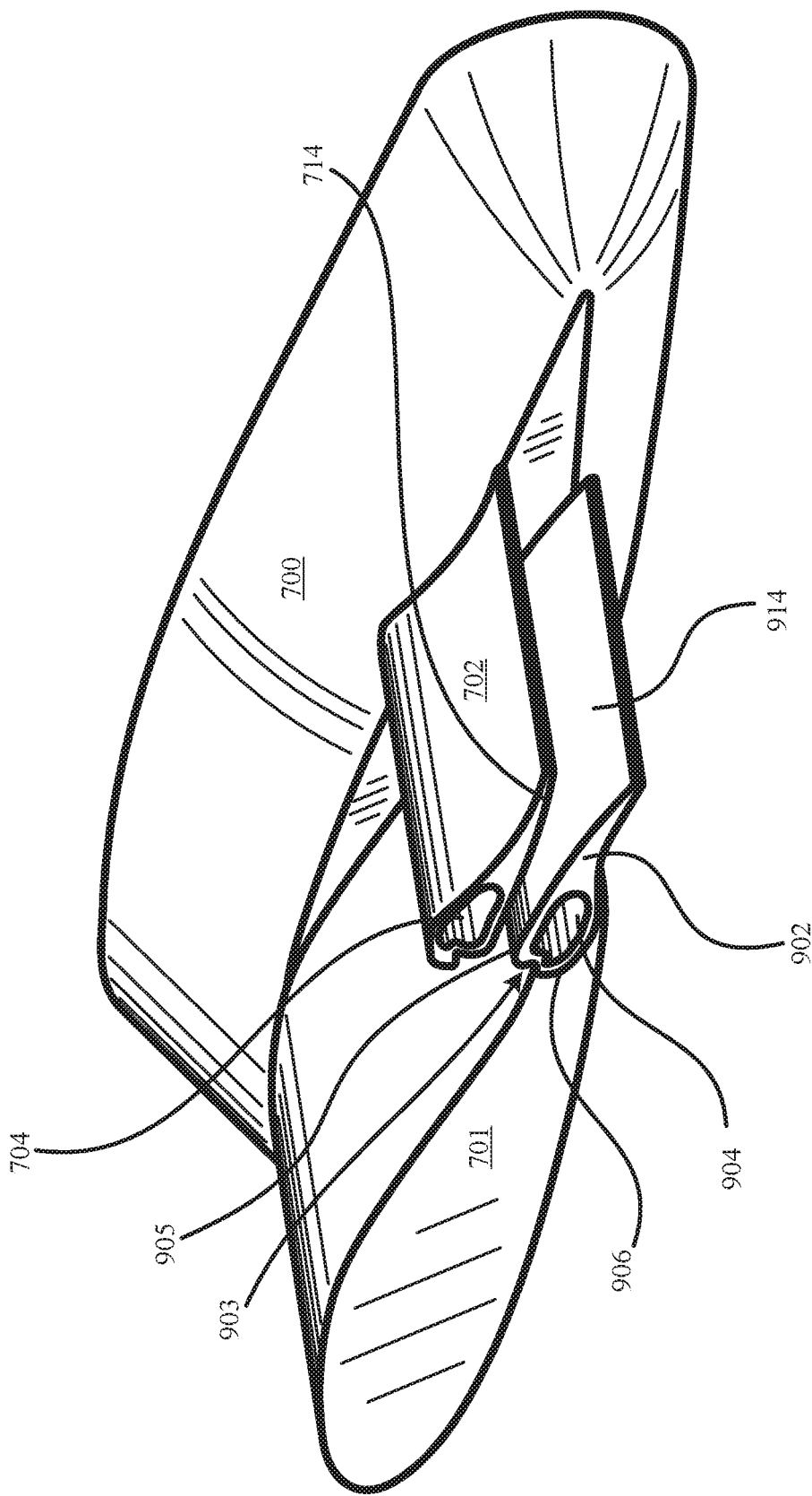
FIGS. 8-9 illustrate another alternative embodiment of the invention.
Figure 9:
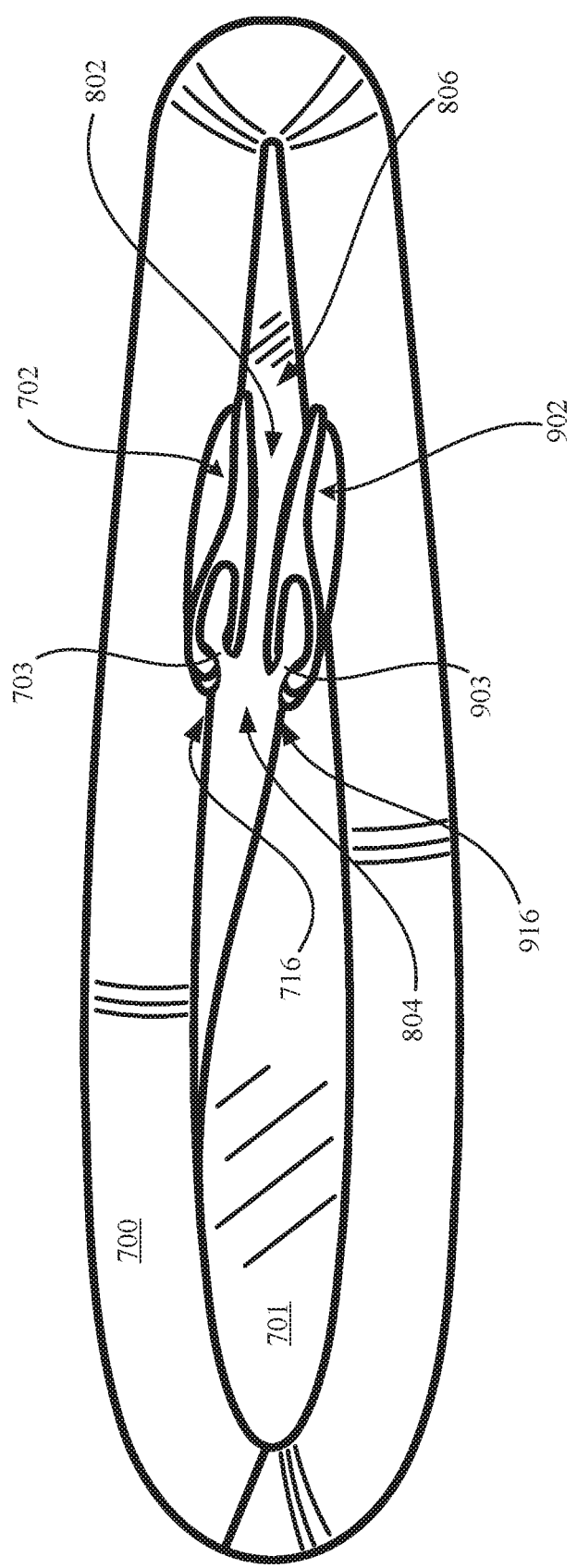

Referring to FIGS. 8-9, an embodiment may include a second augmenting airfoil 902 similar to airfoil 702, each with a respective trailing edge 714, 914 diverging from the other trailing edge. More particularly, second augmenting airfoil 902 is coupled to the vehicle 700 and positioned downstream of fluid flowing over the primary airfoil 701 of the vehicle. Airfoil 902 is configured to rotate in a manner similar to that discussed above with reference to airfoil 702. Airfoil 902 includes a first output structure, such as opposing nozzle surfaces 905, 906 and at least one conduit, such as plenum 904, in fluid communication with a terminal end 903 defined by the nozzle surfaces. Nozzle surfaces 905, 906 may or may not include nozzles similar to nozzles 203 discussed above with reference to FIG. 1. Additionally, one or more of nozzle surfaces 905, 906 may include a convex surface that can, consequently, promote the Coanda effect. Plenum 904 is supplied with hotter-than-ambient air (i.e., a pressurized motive gas stream) from, for example, a combustion-based engine that may be employed by the vehicle 700. Plenum 904 is configured to introduce this gas stream to the terminal end 903, which is configured to provide egress for the gas stream toward the primary airfoil 701 and out of the second augmenting airfoil 902.

Each of the first and second augmenting airfoils 702, 902 has a leading edge 716, 916 disposed toward the primary airfoil, with the first augmenting airfoil opposing the second augmenting airfoil. In operation, the first and second augmenting airfoils 702, 902 define a diffusing region 802, therebetween and along their lengths, similar in function to diffuser 210 discussed above herein. The leading edges 716, 916 define an intake region 804 configured to receive and introduce to the diffusing region 802 the gas streams from plena 704, 904 and the fluid flowing over the primary airfoil 701. The diffusing region 802 includes a primary terminal end 806 configured to provide egress from the diffusing region for the introduced gas streams and fluid flowing over the primary airfoil 701.

Figure 10:
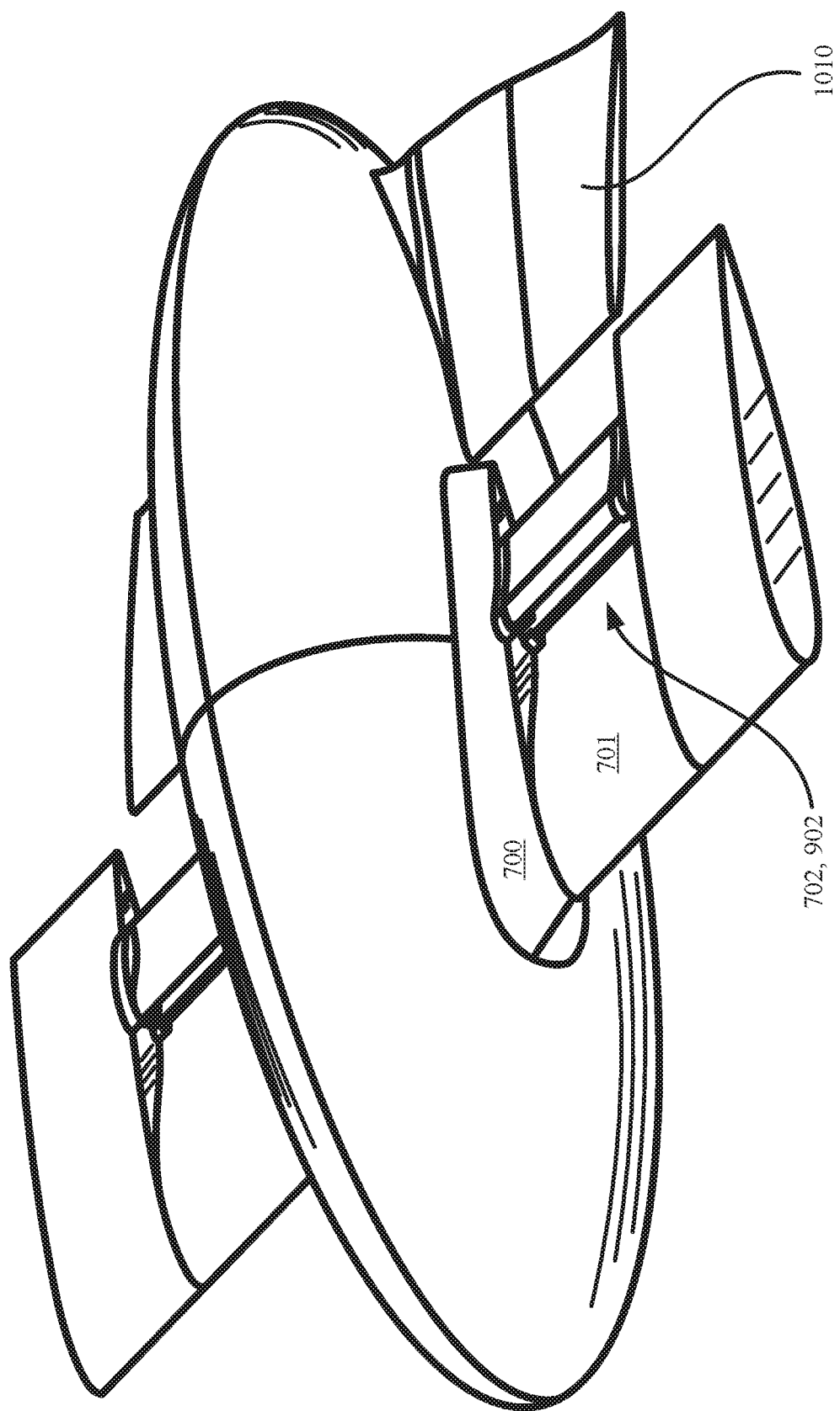
FIG. 10 illustrates yet another alternative embodiment of the invention.

FIG. 10 depicts an alternative embodiment of the present invention featuring tandem wings. In the illustrated embodiment, a secondary airfoil 1010 is placed directly downstream of the augmenting airfoils 702, 902 such that the fluid flowing over the primary airfoil 701 and the gas stream from the augmenting airfoils flows over the secondary airfoil. The combination of the two relatively shorter wings 701, 1010 produce more lift than that of a much larger-spanned wing lacking the augmenting airfoils 702, 902 and that rely on a jet engine attached to a larger wing to produce thrust.

Although the foregoing text sets forth a detailed description of numerous different embodiments, it should be understood that the scope of protection is defined by the words of the claims to follow. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed is:

1. A propulsion system for a vehicle, the system comprising:
   a primary airfoil coupled to the vehicle;
   a first augmenting airfoil coupled to the vehicle and positioned downstream of fluid flowing over the primary airfoil, the first augmenting airfoil comprising a first output structure and at least one first conduit coupled to the first output structure, the at least one first conduit configured to introduce to the first output structure a primary fluid produced by the vehicle, the first output structure comprising a first terminal end configured to provide egress for the introduced primary fluid toward the primary airfoil and out of the first augmenting airfoil; and
   a secondary airfoil located directly downstream of the first augmenting airfoil such that the fluid flowing over the primary airfoil and the primary fluid from the first augmenting airfoil flows over the secondary airfoil.

2. The system of claim 1, further comprising a second augmenting airfoil coupled to the vehicle and positioned downstream of fluid flowing over the primary airfoil, each of the first and second augmenting airfoils having a leading edge disposed toward the primary airfoil, the first augmenting airfoil opposing the second augmenting airfoil whereby:
   the first and second augmenting airfoils define a diffusing region; and
   the leading edges define an intake region configured to receive and introduce to the diffusing region the primary fluid and the fluid flowing over the primary airfoil, the diffusing region comprising a primary terminal end configured to mix and provide the introduced primary fluid and fluid flowing over the primary airfoil to the secondary airfoil.

3. The system of claim 2, wherein the second augmenting airfoil comprises a second output structure and at least one second conduit coupled to the second output structure, the at least one second conduit configured to introduce to the second output structure the primary fluid produced by the vehicle, the second output structure comprising a second terminal end configured to provide egress for the introduced primary fluid toward the primary airfoil and out of the second augmenting airfoil.

4. The system of claim 1, further comprising a first actuator configured to rotate the first augmenting airfoil relative to the vehicle.

5. The system of claim 2, further comprising a second actuator configured to rotate the second augmenting airfoil relative to the vehicle.

* * * * *